United States Patent [19]

Kuwabara

[11] Patent Number: 5,223,195
[45] Date of Patent: Jun. 29, 1993

[54] SINTERED CERAMIC ARTICLE

[75] Inventor: Mitsuo Kuwabara, Sayama, Japan

[73] Assignee: Honda Giken Kogyo Kabushiki Kaisha, Tokyo, Japan

[21] Appl. No.: 325,295

[22] Filed: Mar. 17, 1989

[30] Foreign Application Priority Data

Mar. 18, 1988 [JP] Japan ................................. 63-65051
Jun. 29, 1988 [JP] Japan ................................. 63-162130
Oct. 17, 1988 [JP] Japan ................................. 63-261019

[51] Int. Cl.⁵ ...................... C04B 41/85; C04B 41/88; C04B 41/87
[52] U.S. Cl. ....................................... 264/60; 164/101; 264/62; 427/226; 427/299
[58] Field of Search ................... 264/60, 62; 427/226, 427/299; 164/101

[56] References Cited

U.S. PATENT DOCUMENTS

| | | | |
|---|---|---|---|
| 3,031,340 | 4/1962 | Girardot | 117/118 |
| 3,594,455 | 7/1971 | Polovoi | 263/52 |
| 3,699,044 | 10/1972 | Dooch et al. | 252/62.9 |
| 3,713,855 | 1/1973 | Wright | 106/58 |
| 3,734,767 | 5/1973 | Church et al. | 117/123 |
| 3,776,744 | 12/1973 | Clendenen | 106/73.4 |
| 3,789,096 | 1/1974 | Church et al. | 264/60 |
| 3,817,781 | 6/1974 | Church et al. | 117/169 |
| 3,852,078 | 12/1974 | Wakatsuki et al. | 106/43 |
| 3,925,575 | 12/1975 | Church et al. | 427/226 |
| 3,969,553 | 7/1976 | Kondo et al. | 427/299 |
| 4,001,362 | 1/1977 | Delmon et al. | 264/56 |
| 4,081,857 | 3/1978 | Hanold, III | 361/321 |
| 4,105,455 | 8/1978 | Koga et al. | 106/44 |
| 4,126,652 | 11/1978 | Oohara et al. | 264/29.6 |
| 4,184,883 | 1/1980 | Hughes et al. | 106/56 |
| 4,242,140 | 12/1980 | Alther | 106/72 |
| 4,471,059 | 9/1984 | Yoshino et al. | 501/96 |
| 4,507,224 | 3/1985 | Toibana et al. | 252/516 |
| 4,537,865 | 8/1985 | Okabe et al. | 501/135 |
| 4,569,921 | 2/1986 | Omori et al. | 501/88 |
| 4,574,003 | 3/1986 | Gerk | 51/309 |
| 4,666,872 | 5/1987 | Baney et al. | 501/88 |
| 4,698,319 | 10/1987 | Ray | 501/87 |
| 4,751,070 | 6/1988 | Pai Verneker | 423/592 |
| 4,753,764 | 6/1988 | Kamijo et al. | 264/63 |
| 4,759,879 | 7/1988 | Cadoff et al. | 252/629 |
| 4,767,729 | 8/1988 | Osman et al. | 501/94 |
| 4,784,686 | 11/1988 | Meek et al. | 75/0.5 |

FOREIGN PATENT DOCUMENTS

| | | |
|---|---|---|
| 0122522 | 3/1984 | European Pat. Off. . |
| 8909755 | 10/1989 | Fed. Rep. of Germany . |
| 50-44205 | 4/1975 | Japan . |
| 53-33208 | 3/1978 | Japan . |
| 4142219 | 11/1979 | Japan . |
| 58-64275 | 4/1983 | Japan . |
| 1-122985A | 8/1989 | Japan . |
| WO8802742 | 4/1988 | PCT Int'l Appl. . |
| 1325204 | 8/1973 | United Kingdom . |
| 1325205 | 8/1973 | United Kingdom . |
| 1446076 | 8/1976 | United Kingdom . |
| 1536290 | 12/1978 | United Kingdom . |
| 2104103 | 3/1983 | United Kingdom . |

Primary Examiner—James Derrington
Attorney, Agent, or Firm—Birch, Stewart, Kolasch & Birch

[57] ABSTRACT

A sintered ceramic article which is to be joined to metal or form a composite member with metal comprises a metal compound or a metal separated and diffused in surface layers of particles of the sintered ceramic article. The sintered ceramic article is manufactured, for example, by forming a shaped article of ceramic powder, provisionally firing the shaped article, thereafter impregnating the provisionally fired article with a metal salt and/or a metal complex; and fully firing the provisionally fired article to produce a sintered ceramic article.

10 Claims, 20 Drawing Sheets

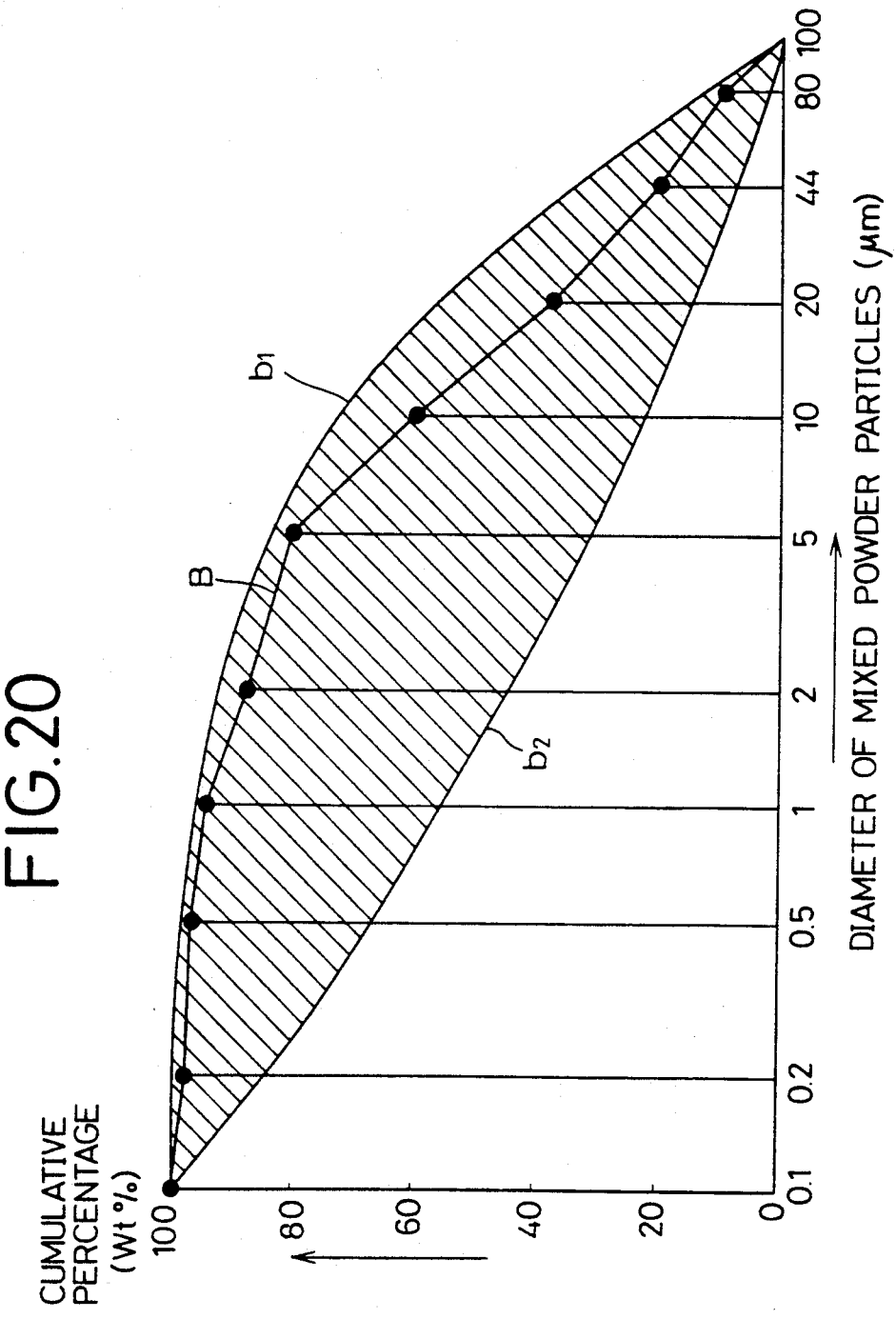

SINTERED CERAMIC ARTICLE

BACKGROUND OF THE INVENTION

The present invention relates to a sintered ceramic article and a method of manufacturing the same, and more particularly to a sintered ceramic article in the form of a composite body made of ceramic and metal and having high toughness and mechanical strength and a method of manufacturing such a sintered ceramic article.

Ceramics are widely used recently to manufacture various mechanical components since they are excellent in mechanical strength and heat resistance. It is known, however, that ceramics are generally poor in toughness. There have been proposed sintered composite ceramic materials made of ceramic and metal in order to eliminate the problem of poor toughness.

According to one known process of producing such a sintered ceramic material, ceramic powder and metal powder are mixed together and formed into a certain shape, and the shaped article is fired by being heated at a high temperature to produce a sintered product. With the conventional process, however, since the firing temperature is higher than the melting point of the metal powder, the metal powder is melted in the firing step and the metal particles are coagulated or not uniformly dispersed in the sintered product. As a result, the produced sintered ceramic article tends to have different local mechanical strengths or toughnesses.

There has been proposed a method of producing a sintered ceramic article by forming a shaped article made of a mixture of ceramic power and metal carbide or metal nitride, and burning the shaped article in a reducing atmosphere to separate out the metal. One problem with this process is that a relatively large amount of metal is separated out in the surface layer of the sintered ceramic article, whereas a less amount of metal is separated out within the sintered ceramic article. Accordingly, it is difficult to uniformly metallize the sintered article in its entirety, and the sintered article cannot have a desired degree of toughness.

SUMMARY OF THE INVENTION

It is a primary object of the present invention to provide a sintered ceramic article and a method of manufacturing such a sintered ceramic article by forming a shaped article of ceramic power, metal powder, or a mixture thereof, provisionally firing the shaped article while the shaped article is being impregnated with a metal salt or metal complex, and then fully firing the shaped article, so that the metal salt or metal complex can sufficiently be impregnated in pores produced in the provisionally sintered shaped article, thereby making the fully sintered article is of a high quality, having a high degree of toughness and mechanical strength.

Another object of the present invention is to provide a sintered ceramic article for being joined to metal or forming a composite member with metal, comprising a metal compound or a metal separated and diffused in surface layers of particles of the sintered ceramic article.

Still another object of the present invention is to provide a method of manufacturing a sintered ceramic article, comprising the steps of: forming a shaped article of ceramic powder; provisionally firing said shaped article; thereafter impregnating the provisionally fired article with a metal salt and/or a metal complex; and fully firing the provisionally fired article to produce a sintered ceramic article.

Yet another object of the present invention is to provide a method of manufacturing a sintered ceramic article, comprising the steps of: mixing an acid or alkaline solution in ceramic powder to adjust the pH of the ceramic powder; forming the ceramic powder into a shaped article; provisionally firing said shaped article; thereafter impregnating the provisionally fired article with a metal salt and/or a metal complex; and fully firing the provisionally fired article to produce a sintered ceramic article.

Yet still another object of the present invention is to provide a method further including the steps of: adjusting the pH of a slurry containing the ceramic powder; and thereafter deaerating said slurry.

Another object of the present invention is to provide a method further including the step of: casting a slurry containing the ceramic powder in a gypsum mold to produce said shaped article.

Still another object of the present invention is to provide a method further including the step of: forming a slurry containing the ceramic powder into said shaped article by injection molding or pressure casting.

Yet another object of the present invention is to provide a method of manufacturing a sintered ceramic article, comprising the steps of: forming a shaped article of ceramic powder; provisionally firing said shaped article; thereafter impregnating the provisionally fired article with a metal salt and/or a metal complex; and fully firing the provisionally fired article in an inert or reducing atmosphere to produce a sintered ceramic article.

Yet still another object of the present invention is to provide a method wherein said provisionally fired article is fully fired in a nitrogen-gas atmosphere.

A further object of the present invention is to provide a method further including the step of: mixing an acid or alkaline solution in ceramic powder to adjust the pH of the ceramic powder.

A still further object of the present invention is to provide a method of manufacturing a sintered ceramic article, comprising the steps of: mixing composite powder of ceramic and a metal with ceramic powder to produce mixed powder; forming the mixed powder into a shaped article; provisionally firing said shaped article; thereafter impregnating the provisionally fired article with a metal salt and/or a metal complex; and fully firing the provisionally fired article to produce a sintered ceramic article.

A yet further object of the present invention is to provide a method further including the step of: mixing an acid or alkaline solution in said mixed powder to adjust the pH of the mixed powder.

It is also an object of the present invention to provide a method of manufacturing a sintered ceramic article, comprising the steps of: mixing composite powder of ceramic and a metal with ceramic powder to produce mixed powder; forming the mixed powder into a shaped article; provisionally firing said shaped article; thereafter impregnating the provisionally fired article with a metal salt and/or a metal complex; and fully firing the provisionally fired article in an inert or reducing atmosphere to produce a sintered ceramic article.

Another object of the present invention is to provide a method wherein said provisionally fired article is fully fired in a nitrogen-gas atmosphere.

Still another object of the present invention is to provide a method further including the step of: mixing an acid or alkaline solution in said mixed powder to adjust the pH of the mixed powder.

Yet another object of the present invention is to provide a method of manufacturing a sintered ceramic article, comprising the steps of: forming a shaped article of reaction sintering metal powder; provisionally firing said shaped article; thereafter impregnating the provisionally fired article with a metal salt and/or a metal complex; and subjecting the provisionally fired article to reaction firing to produce a sintered ceramic article.

Yet another object of the present invention is to provide a method of manufacturing a sintered ceramic article, comprising the steps of: forming a shaped article of reaction sintering metal powder with a grain and a grain distribution adjusted for a close-packed structure; provisionally firing said shaped article; thereafter impregnating the provisionally fired article with a metal salt and/or a metal complex; and subjecting the provisionally fired article to reaction firing to produce a sintered ceramic article.

Yet still another object of the present invention is to provide a method of manufacturing a sintered ceramic article, comprising the steps of: forming a shaped article of ceramic powder and reaction sintering metal powder; provisionally firing said shaped article; thereafter impregnating the provisionally fired article with a metal salt and/or a metal complex; and subjecting the provisionally fired article to reaction firing to produce a sintered ceramic article.

A further object of the present invention is to provide a method of manufacturing a sintered ceramic article, comprising the steps of: forming a shaped article of a powder mixture composed of ceramic powder and reaction sintering metal powder, with a gain and a grain distribution adjusted for a close-packed structure; provisionally firing said shaped article; thereafter impregnating the provisionally fired article with a metal salt and/or a metal complex; and subjecting the provisionally fired article to reaction firing to produce a sintered ceramic article.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 20 is a graph showing the relationship between the diameter of mixed powder particles and the cumulative percentage in a manufacturing method according to a twelfth embodiment of the present invention.

DETAILED DESCRIPTION OF THE PREFERRED EMBODIMENTS

Ceramic powder used to produce a sintered ceramic article according to the present invention is preferably of an oxide such as $SiO_2$, $Al_2O_3$, or $ZrO_2$, a nitride such as $Si_3N_4$, TiN, ZrN, BN, or the like, or a carbide such as SiC, TiC, MoC, or the like.

A metal salt used is a hydroxide, a carbonate, a nitrate, a chloride, an oxalate, or the like such as Al, Ti, V, Cr, Mn, Fe, Co, Ni, Cu, Y, Zr, Nb, Mo, Tc, Nd, Ta, W, Re, Os, Ag, Ir, or the like, or their composite salt, or heteropoly-acid, or the like. A metal complex used is an ammine complex, a cyan complex, or the like of any of the above metals. A solvent used for the above metal salts and the metal complexes is water, alcohol, or an organic solvent of hexane or toluene, and the solution is of a saturated concentration.

An atmosphere in which a shaped article is fired may be any atmosphere in which a metal can be separated out, and may be a reducing atmosphere or an inert-gas atmosphere such as $H_2$—Ar, $H_2$—$N_2$, $H_2$—$NH_3$, $N_2$, Ar, or the like.

A method of manufacturing a sintered ceramic article according to a first embodiment of the present invention will be described below.

Figure 1A:
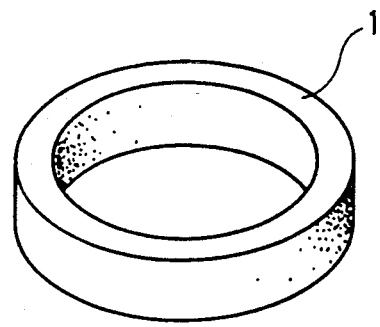
FIG. 1(a) through 1(c) are views of sintered ceramic articles according to the present invention.
Figure 1B:
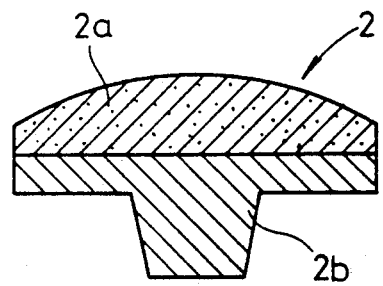
Figure 1C:
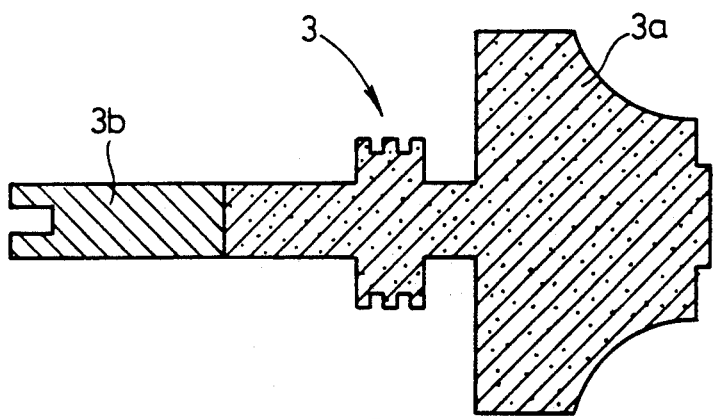

Products made from sintered ceramic produced according to the manufacturing method of the present invention are shown in FIGS. 1(a) through 1(c). FIG. 1(a) illustrates a valve seat 1 to be incorporated in the cylinder head of an engine. FIG. 1(b) shows a tip 2 for use on a rocker arm, the tip 2 comprising a sliding member 2a made of sintered ceramic and a metal member 2b joined to the sliding member 2a. FIG. 2(c) shows a turbine 3 comprising a turbine wheel 3a made of sintered ceramic and a shaft 3b joined to the turbine wheel 3a.

Figure 2:
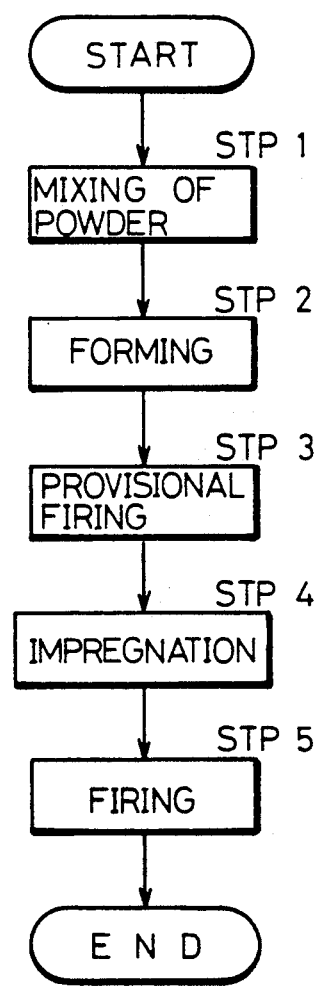
FIG. 2 is a flowchart of a process sequence of a method of manufacturing a sintered ceramic article according to a first embodiment of the present invention.

The manufacturing method of the first embodiment will be described with reference to the flowchart of FIG. 2. First, any one of the ceramic powders referred to above, the powder of a sintering assistant such as $Y_2O_3$, $Al_2O_3$, $SiO_2$, MgO, or the like, and carbon powder, if necessary, are mixed together in a step STP1. The mixed powder is formed into a desired shape by injection molding, extrusion molding, pressing, casting, or the like in a step STP2. After the mixed powder has been shaped, it is degreased and then provisionally fired for several hours at a temperature ranging from 800° C. to 1200° C. in an inert-gas atmosphere to produce a provisionally fired article having a density ranging from 60% to 90% in a step STP3.

Then, the provisionally fired article is immersed in a saturated solution of the metal salt or the metal complex in a step STP4. The provisionally fired article which is thus impregnated with the metal salt or the metal complex is then fully fired in a step STP5. More specifically, the provisionally fired article is fired in an inert-gas or reducing atmosphere in a furnace for 45 minutes at 700° C., then 60 minutes at 1350° C., 30 minutes at 1500° C., 60 minutes at 1700° C., and finally 60 minutes at 1400° C., after which the article is cooled in the furnace.

While the shaped article is being fully fired, the metal salt or the metal complex attached to the surfaces of the particles of the provisionally fired article is decomposed, separating out a metal compound such as an oxide, a nitride, a carbide, or the like, or a metal on the surfaces of the particles. During the fully firing step, the separated metal compound or metal is diffused into the ceramic particles from the surfaces thereof. As a consequence, a sintered ceramic article is produced in which a metal compound layer or a metal layer is formed on the surfaces of the ceramic particles.

The metal salt or the like is used in the form of the saturated solution. When the solution of the metal salt or the like is impregnated in the provisionally fired article, ultrasonic energy is applied to cause the solution to be impregnated with higher efficiency. This is because if the concentration of the metal salt or the like in the solution is low, no metal would be separated out in the fully firing step, and the remaining metal salt or the like would render the sintered ceramic article brittle and mechanically weak.

The mechanism of separation of a metal from the metal salt or the like is as follows: In the fully firing step, part of the metal salt or the like retained in the provisionally fired article through impregnation is converted to a carbide, a nitride, or a carbide nitride, which is discharged as an impurity into grain boundaries and/or grain boundary layers upon the growth of the ceramic or ceramic particles. Thereafter, a metal is separated out in the center of the grain boundaries and/or the grain boundary layers due to the difference between the amounts by which carbon, nitrogen, and the like are dissolved into the metal. In the region where the metal is separated out, the concentration of carbon and nitrogen varies progressive from the center toward the periphery of the region, and the amount of metal is reduced microscopically.

With the metal separated out in the center of grain boundaries and/or grain boundary layers, when a stress is applied to the sintered ceramic article, the stress is propagated rapidly in the ceramic which constitutes a rigid body, but propagated slowly in the region where the metal is separated out. The applied stress is thus dispersed, absorbed, and delayed in the sintered ceramic article, which is thus has increased mechanism strength and fracture toughness.

According to the first embodiment described above, the provisionally fired article is immersed in the solution of a metal salt or a metal complex. Therefore, the solution is sufficiently attached to the surfaces of the ceramic particles. In the subsequent fully firing step, consequently, a metal compound or a metal is sufficiently separated out and diffused in the surface layers of the ceramic particles. As a consequence, the wettability between the sintered ceramic article and metal is increased. As shown in FIGS. 1(b) and 1(c), for example, the sliding member 2a and the metal member 2b of the tip 2 are firmly joined to each other, and the turbine wheel 3a and the shaft 3b of the turbine 3 are securely joined to each other.

A method of manufacturing a sintered ceramic article according to a second embodiment of the present invention will be described below.

According to the second embodiment, powder of silicon nitride ($Si_3N_4$) having an average diameter of 0.5 $\mu$m is employed as ceramic powder. 90 wt % of silicon nitride powder is mixed with 5 wt % of powder of yttrium oxide ($Y_2O_3$) having an average diameter of 0.4 $\mu$m and 5 wt % of aluminum oxide ($Al_2O_3$) having an average diameter of 0.4 $\mu$m. The powder mixture is then formed into a shaped article.

Then, the shaped article is dried and degreased, after which it is provisionally fired while nitrogen is being passed at 1200° C. under 0.4 Torr, thus producing a provisionally fired article. The provisionally fired article is then immersed in water and cleaned by a ultrasonically cleaning process.

After the provisionally fired article has been cleaned, it is immersed in a saturated solution of chromium nitrate and boiled for five minutes. The provisionally fired article is then immersed in 8M (mol/l) of a saturated hydrochloric acid solution of copper and an ammonium complex, and boiled for five minutes.

The provisionally fired article is thereafter dried and then fully fired for two hours at 1700° C. in an atmosphere of an Ar—$N_2$ gas. As a result, a sintered ceramic article in which chromium and copper are separated out is produced.

Figure 3:
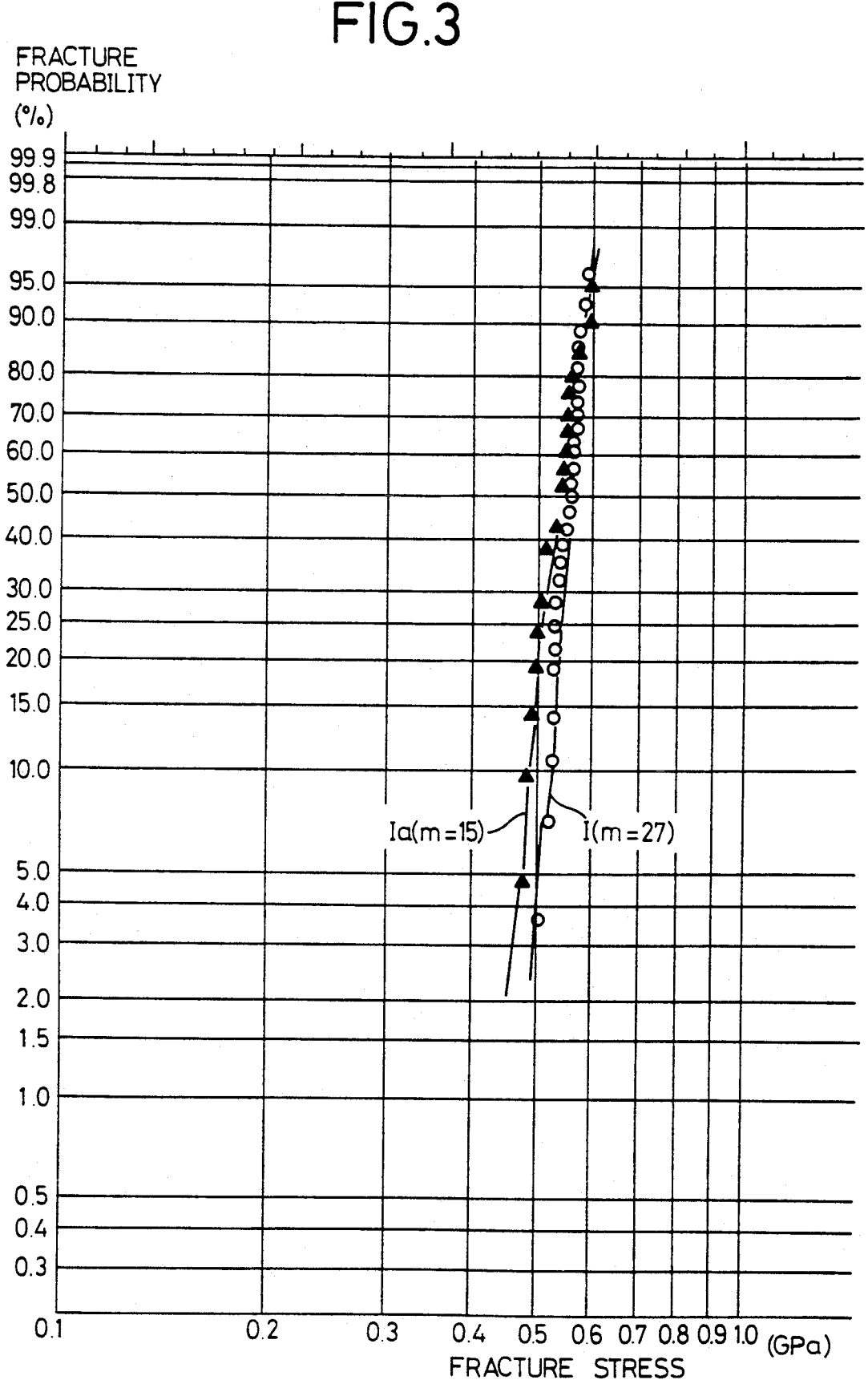
FIG. 3 is a graph showing the Weibull distributions of a sintered ceramic article produced by a manufacturing method according to a second embodiment of the present invention and a conventional sintered ceramic article.

An experiment was conducted on a sintered ceramic article I thus produced and a conventional sintered ceramic article Ia which was produced by firing a shaped article made of a mixture of silicon nitride powder, yttrium oxide powder, and aluminum oxide powder, without employing a metal salt or a metal complex. FIG. 3 shows Weibull distributions of these sintered ceramic articles obtained by a three-point bending test. As can be understood from FIG. 3, the sintered ceramic article I had a Weibull modulus (m)=27, whereas the conventional sintered ceramic article Ia had a Weibull modulus (m)=15. Therefore, it was confirmed that the sintered ceramic article I had a substantially smaller range of different mechanical strengths. Since most ordinary sintered ceramic articles have Weibull moduli (m) ranging from 5 to 20, it was proven that the sintered ceramic article I was excellent in quality.

Figure 4:
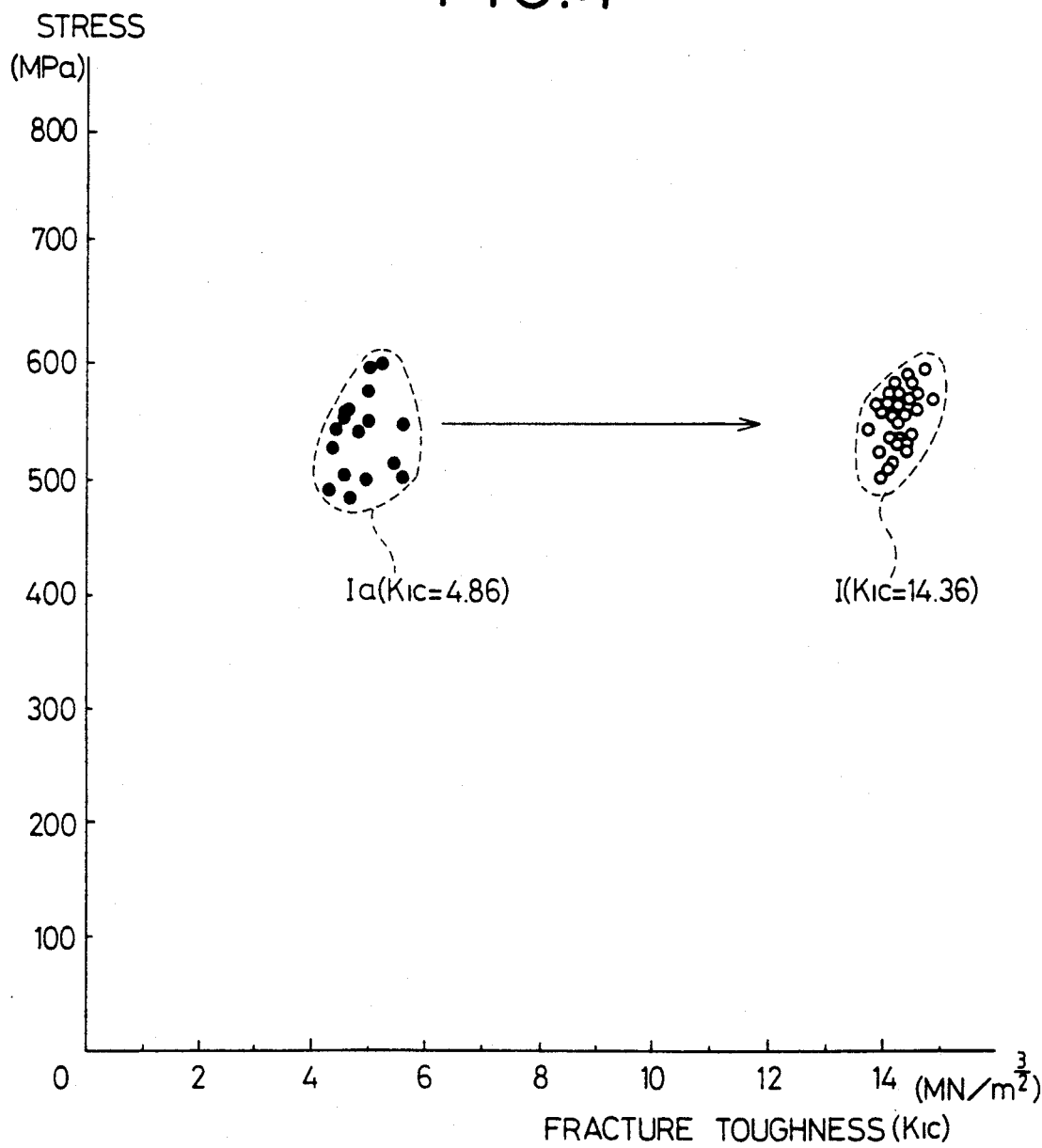
FIG. 4 is a graph showing the fracture toughness of the sintered ceramic article produced by the method of the second embodiment and a sintered ceramic article produced according to a conventional method.

FIG. 4 illustrates the fracture toughness, tested by a chevron notch process, of the sintered ceramic article I and the conventional sintered ceramic article Ia. The results of the test indicate that while the fracture toughness of the conventional sintered ceramic article Ia was $(K_{IC})=4.86$ $MN/M^{3/2}$, the fracture toughness of the sintered ceramic article I was a considerably larger value of $(K_{IC})=14.36$ $MN/m^{3/2}$. Therefore, it was confirmed that the toughness of the sintered ceramic article I was much higher, and it can be understood that metals (chromium and copper) were uniformly and reliably separated out in the sintered ceramic article I.

According to the manufacturing method of the present invention, a shaped article is formed of a mixture of silicon nitride powder, yttrium oxide powder, and aluminum oxide powder, then the shaped article is provisionally fired, and the provisionally fired article is immersed in a saturated hydrochloric acid solution of copper and an ammonium complex. Therefore, the chromium nitrate solution and the saturated hydrochloric acid solution of copper and an ammonium complex are sufficiently impregnated in pores in the provisionally fired article. Then, the provisionally fired article is fully fired in an atmosphere of an $Ar-N_2$ gas to cause copper and chromium to be uniformly and reliably separated out in a produced sintered ceramic article. As a result, it is possible to manufacture a sintered ceramic article I which is excellent in quality and high in toughness without a wide range of variations in mechanical strength and the like.

A method of manufacturing a sintered ceramic article according to a third embodiment of the present invention will be described below.

First, a first shaped article is formed of a mixture of 84 wt % of silicon nitride powder, 7 wt % of yttrium oxide powder, 4 wt % of aluminum oxide powder, and 5 wt % of zirconium oxide ($ZrO_2$) powder having a primary particle diameter of 370 Å. A second shaped article is formed of 81.7 wt % of silicon carbide (SiC) powder having an average particle diameter of 0.4 $\mu$m, 5 wt % of yttrium oxide powder, 7 wt % of aluminum oxide powder, 3 wt % of zirconium oxide powder, 3 wt % of boron carbide ($B_4C$) powder, and 0.3 wt % of carbon black having a particle diameter of 50 Å.

The first and second shaped articles are dried and then provisionally fired while passing nitrogen at 1200° C. under 0.4 Torr as with the second embodiment to produce first and second provisionally fired articles. The first and second provisionally fired articles are then ultrasonically cleaned and dried at 480° C.

The dried first and second provisionally fired articles are immersed in a saturated solution of nickel nitrate and zirconia nitrate, and then in a saturated solution of chromium nitrate and a copper complex dissolved in hydrochloric acid. Then, the first and second provisionally fired articles are neutralized by water, then dried, and embedded in silicon nitride powder and silicon carbide powder and fully fired for two hours at 1750° C. in an $Ar-N_2$ atmosphere, thus producing a sintered ceramic article II mainly composed of silicon nitride powder and a sintered ceramic article III mainly composed of silicon carbide powder.

Shaped articles were also formed of the same powder mixtures as those of the sintered ceramic articles II, II and fired according to the conventional method without using a metal salt and a metal complex to produce sintered ceramic article IIa, IIIa. The sintered ceramic article II, III and the sintered ceramic articles IIa, IIIa were then compared in the same manner as with the second embodiment.

Figure 5:
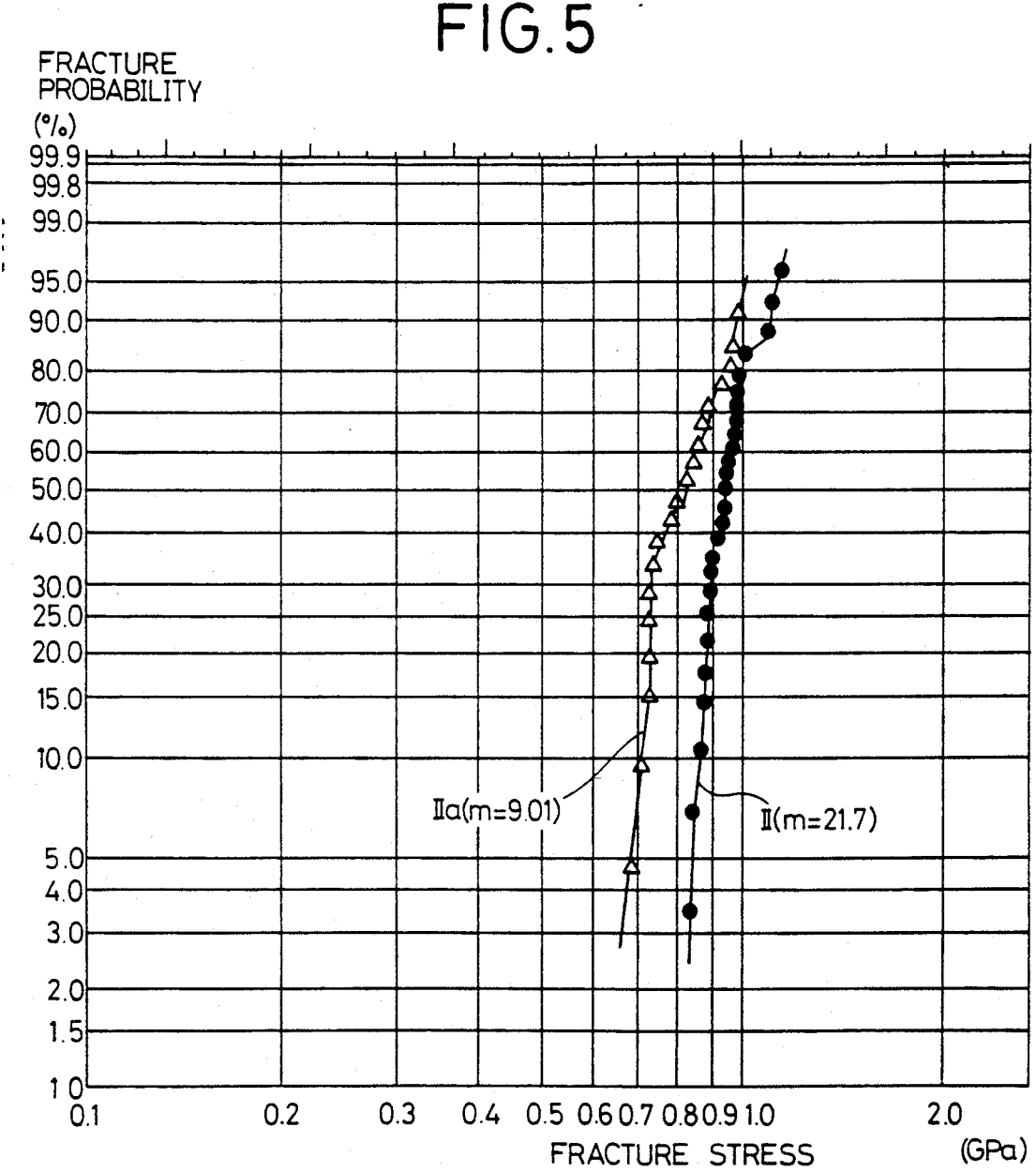
FIGS. 5 and 6 are graphs showing the Weibull distributions of sintered ceramic article produced by a manufacturing method according to a third embodiment of the present invention and sintered ceramic articles produced according to a conventional method.
Figure 6:
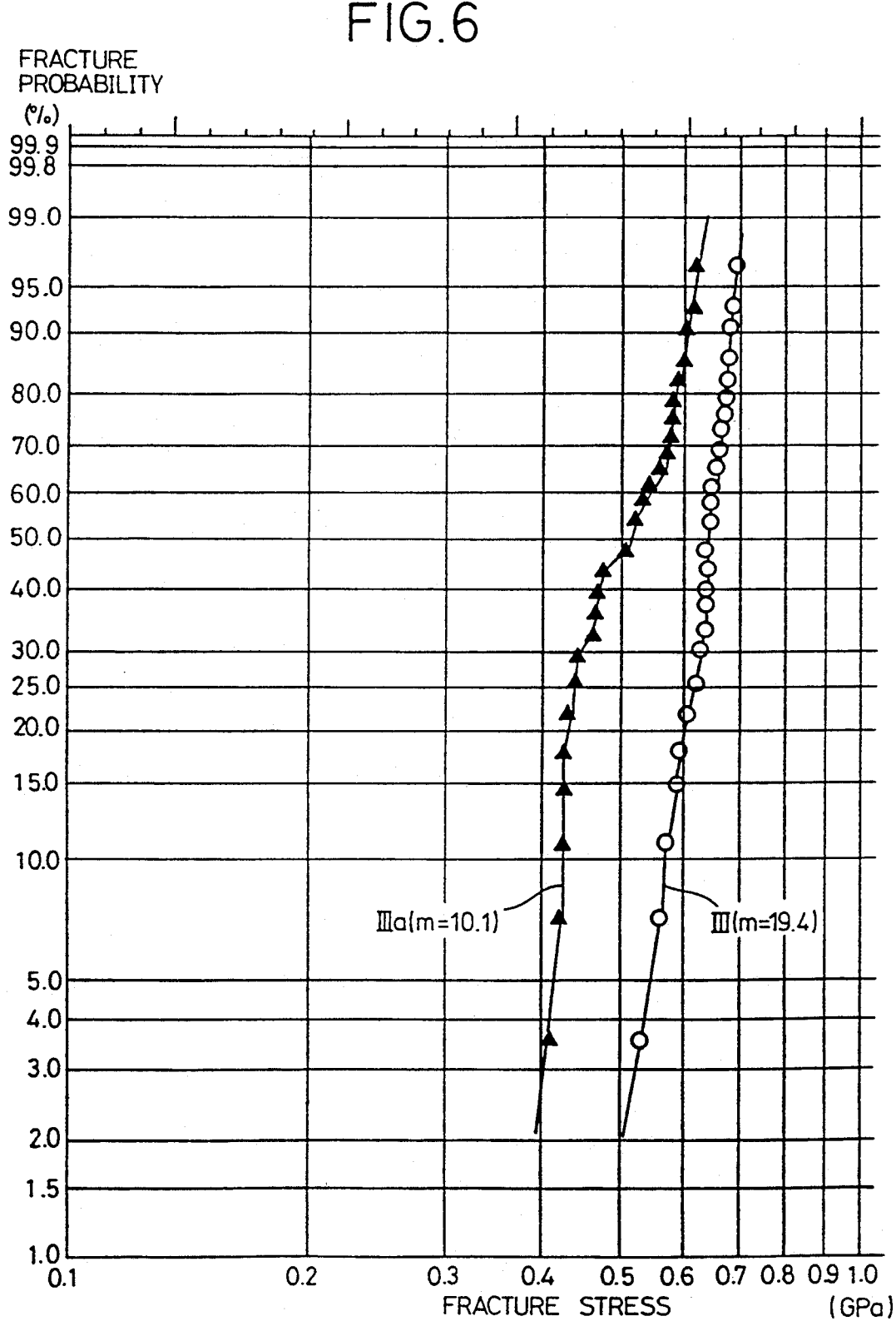

FIGS. 5 and 6 show Weibull distributions of the sintered ceramic articles II, III and the conventional sintered ceramic articles IIa, IIIa. The graphs of FIGS. 5 and 6 indicate that the sintered ceramic articles II, III had respective Weibull moduli (m)=21.7 and 19.4 which were considerably larger than the Weibull moduli (m)=9.01 and 10.1 of the conventional sintered ceramic articles IIa, IIIa.

Figure 7:
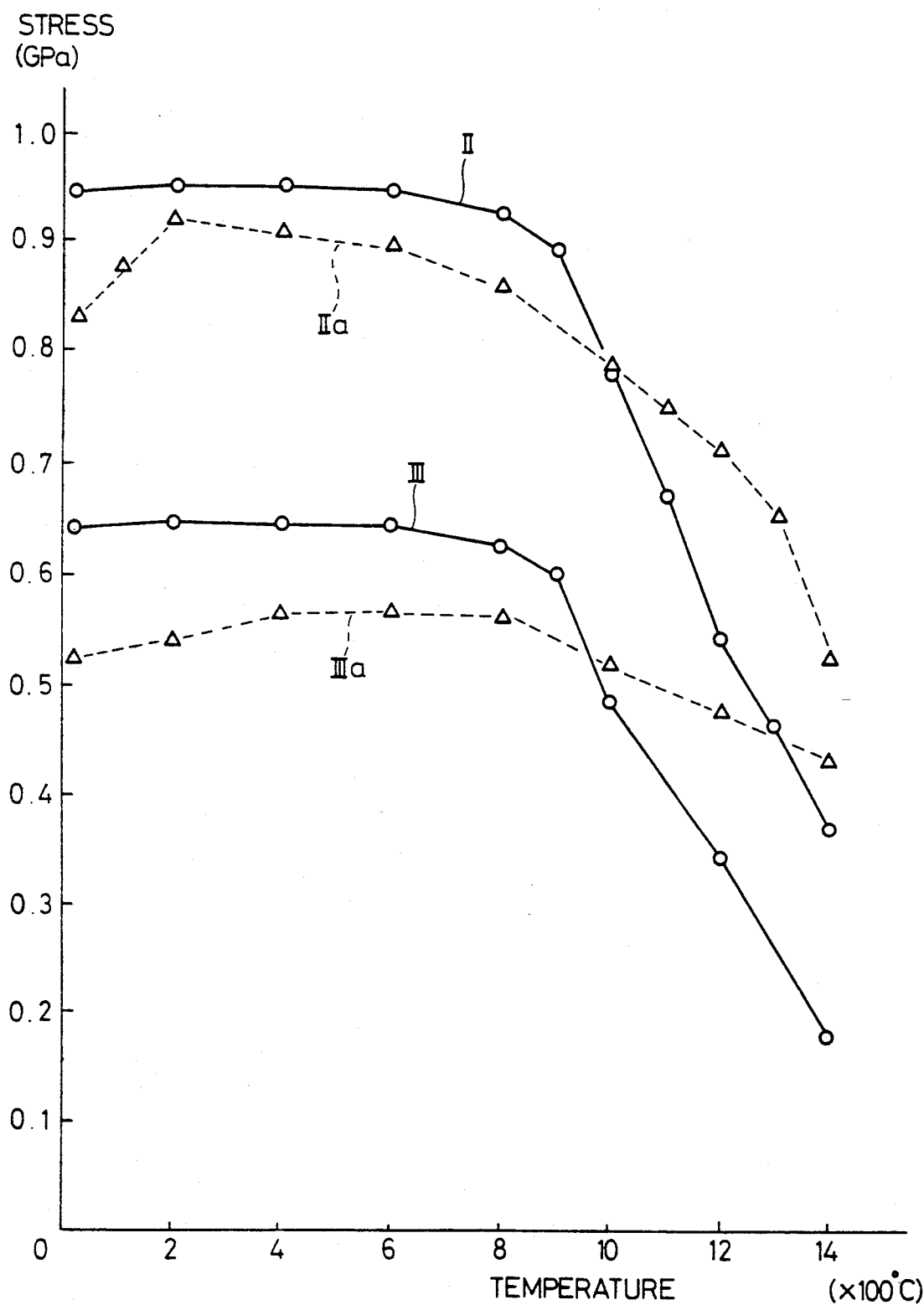
FIG. 7 is a graph showing the relationship between the temperature and flexural strength of the sintered ceramic articles produced according to the third embodiment and the sintered ceramic articles produced by the conventional method, shown in FIGS. 5 and 6.

FIG. 7 shows the results of an experiment in which the sintered ceramic articles II, III, IIa, IIIa were held at each temperature for 15 minutes and subjected to a three-point bending test. It can readily be seen from FIG. 7 that the sintered ceramic articles II, III had higher toughness than the conventional sintered ceramic articles IIa, IIIa, as with the second embodiment.

A method of manufacturing a sintered ceramic article according to a fourth embodiment will be described below in relation to an apparatus for carrying out such a manufacturing method.

According to the manufacturing method of the fourth embodiment, composite powder in the form of a composite of ceramic powder or ceramic whisker and a metal is produced, and then mixed with ceramic powder to provide a shaped article. An apparatus for producing such composite powder will first be described.

Figure 8:
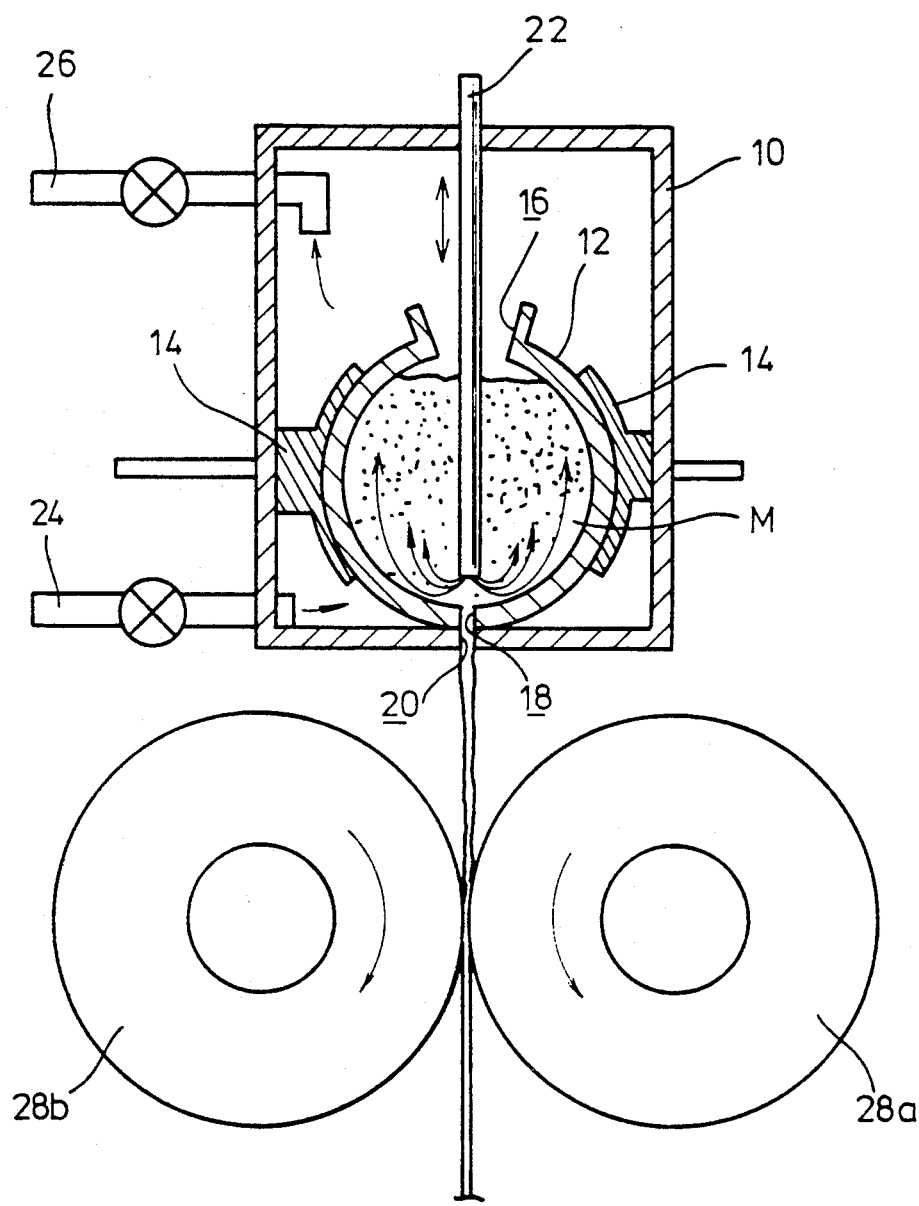
FIG. 8 is a schematic cross-sectional view of an apparatus for carrying out manufacturing methods according to fourth and fifth embodiments of the present invention.

FIG. 8 shows a chamber 10 of the apparatus which houses therein a ladle 12 with its opposite sides held by respective heaters 14. The ladle 12 has an upper opening 16 and a small-diameter outlet port 18 defined in the bottom thereof and communicating with a hole 20 defined in the lower panel of the chamber 10. A stirring gas introducing lance 22 extends downwardly through the upper panel of the chamber 10 into the ladle 12 and has a lower end positioned near the outlet port 18.

A gas supply pipe 24 and a gas discharge pipe 26 are mounted on a side panel of the chamber 10. A pair of drums 28a, 28b is disposed below the chamber 10. The drums 28a, 28b are made of copper or steel and are displaceable horizontally toward and away from each other.

A process of producing the composite powder in the apparatus will be described below.

The powder of a carbide, a nitride, a carbide nitride, or the like such as Si, Ti, Ta, Hf, W, Mo, Cr, or the like, having a particle diameter of 10 $\mu$m or less, is used as ceramic powder. The powder of a metal such as Cu, Al, Fe, Ni, Co, Ng, Si, Ti, V, Cr, Mo, Zr, or the like or their alloy, having an average diameter of 44 $\mu$m is used as metal powder.

According to the fourth embodiment, a powder mixture of nickel powder and 20 wt % of chromium carbide ($Cr_3C_2$) powder is pressed into a shaped article.

Then, the shaped article is placed in the ladle 12, and heated and melted into a mass M by energizing the heaters 14. At this time, air is discharged from the chamber 10 through the gas discharge pipe 26, and Ar, $N_2$, $H_2$, $CO_2$, He, or the like is introduced into the chamber 10 through the gas supply pipe 24 to create an inert-gas or reducing atmosphere in the chamber 10. The same gas is also introduced through the lance 22 into the melted mass M in the ladle 12 to stir the mass M.

The stirred mass M is then dropped through the outlet port 18 and the hole 20 onto the drums 28a, 28b and quenched at a rate of $10^3$ through $10^5$ °C./sec. to produce powder. The produced powder is then ground to provide composite powder having a particle diameter of 10 μm or less (average diameter of 1.2 μm).

1 wt % of the composite powder thus produced, 93 wt % of silicone nitride powder, 4 wt % of yttrium oxide powder, 1 wt % of zirconium oxide powder, and 2 wt % of aluminum oxide powder are mixed into a mixture to which a dispersant, an additive, and water as a solvent are added, and they are mixed. Upon elapse of a predetermined period of time after these ingredients have started being mixed, the pH of the mixture is measured and adjusted, if necessary, by adding ammonia water, and then the mixture is formed into a shaped article.

After the shaped article has been dried, it is degreased by being kept at 650° C. under 0.4 Torr while an $N_2$ gas is being passed, and then the shaped article is provisionally fired for two hours at 1200° C. under the same other conditions to provide a provisionally fired article. The provisionally fired article is immersed in a saturated solution of a certain metal salt and/or a certain metal complex selected from the various metal sats and metal complexes referred to above.

Figure 9:
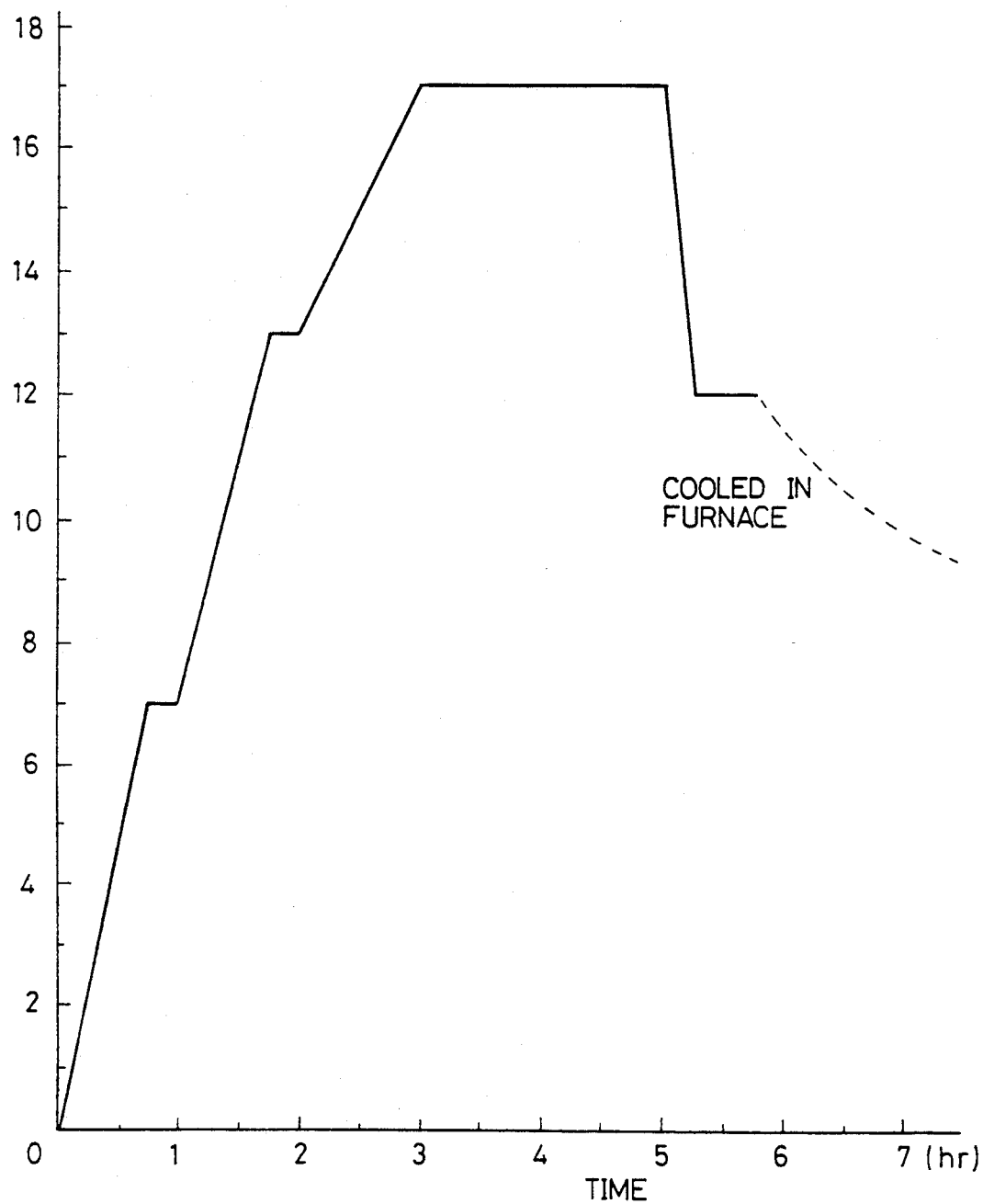
FIG. 9 is a graph showing a fully firing pattern in the manufacturing method of the fourth embodiment.

The provisionally fired article is dried, and then fully fired according to a firing pattern shown in FIG. 9, thus producing a sintered ceramic article.

According to the fourth embodiment, the mechanical strength and toughness of the sintered ceramic article can be adjusted by selecting a value of pH of the mixed powder.

Figure 10:
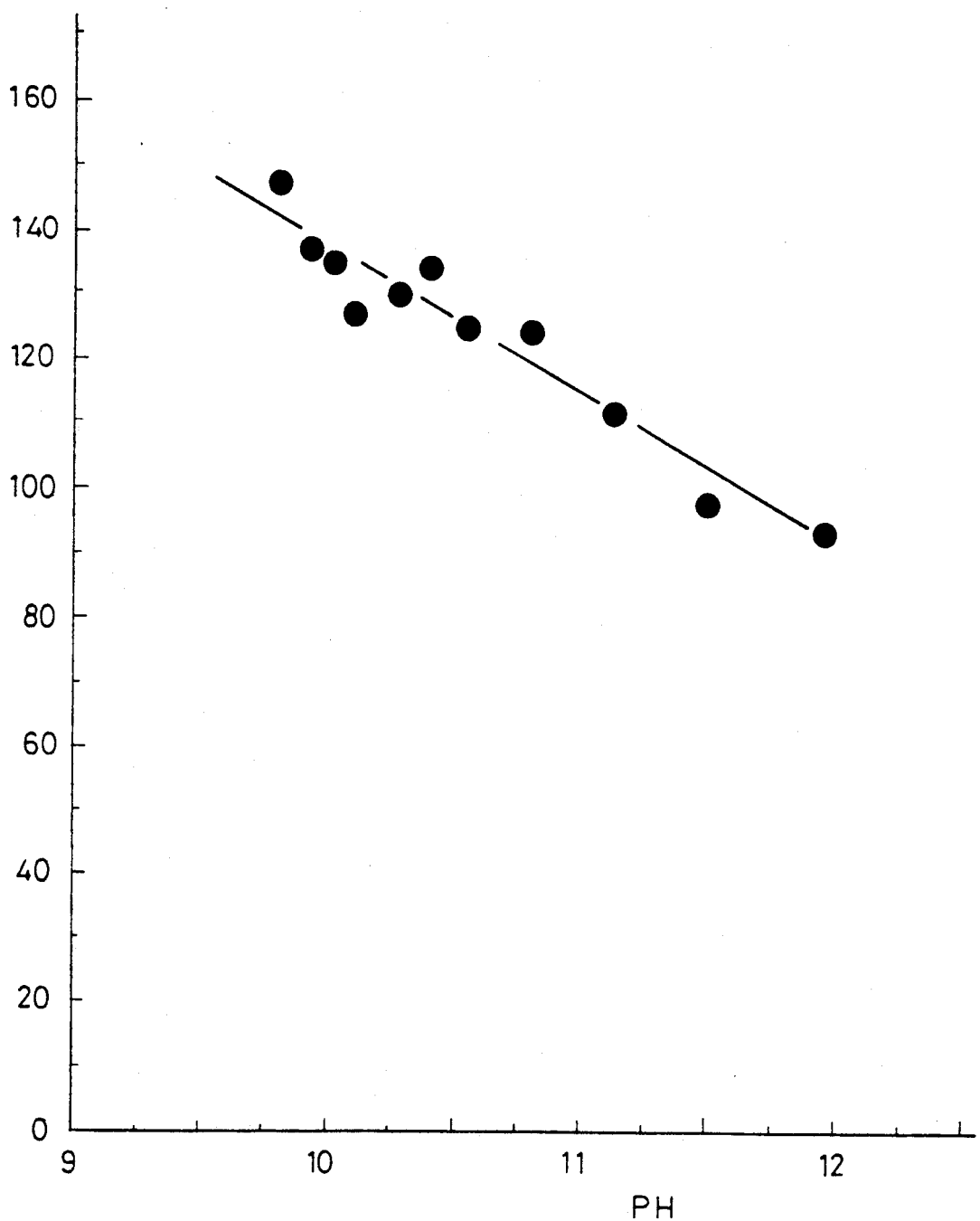
FIG. 10 is a graph showing the relationship between the pH of mixed powder and the mechanical strength of a sintered article.
Figure 11:
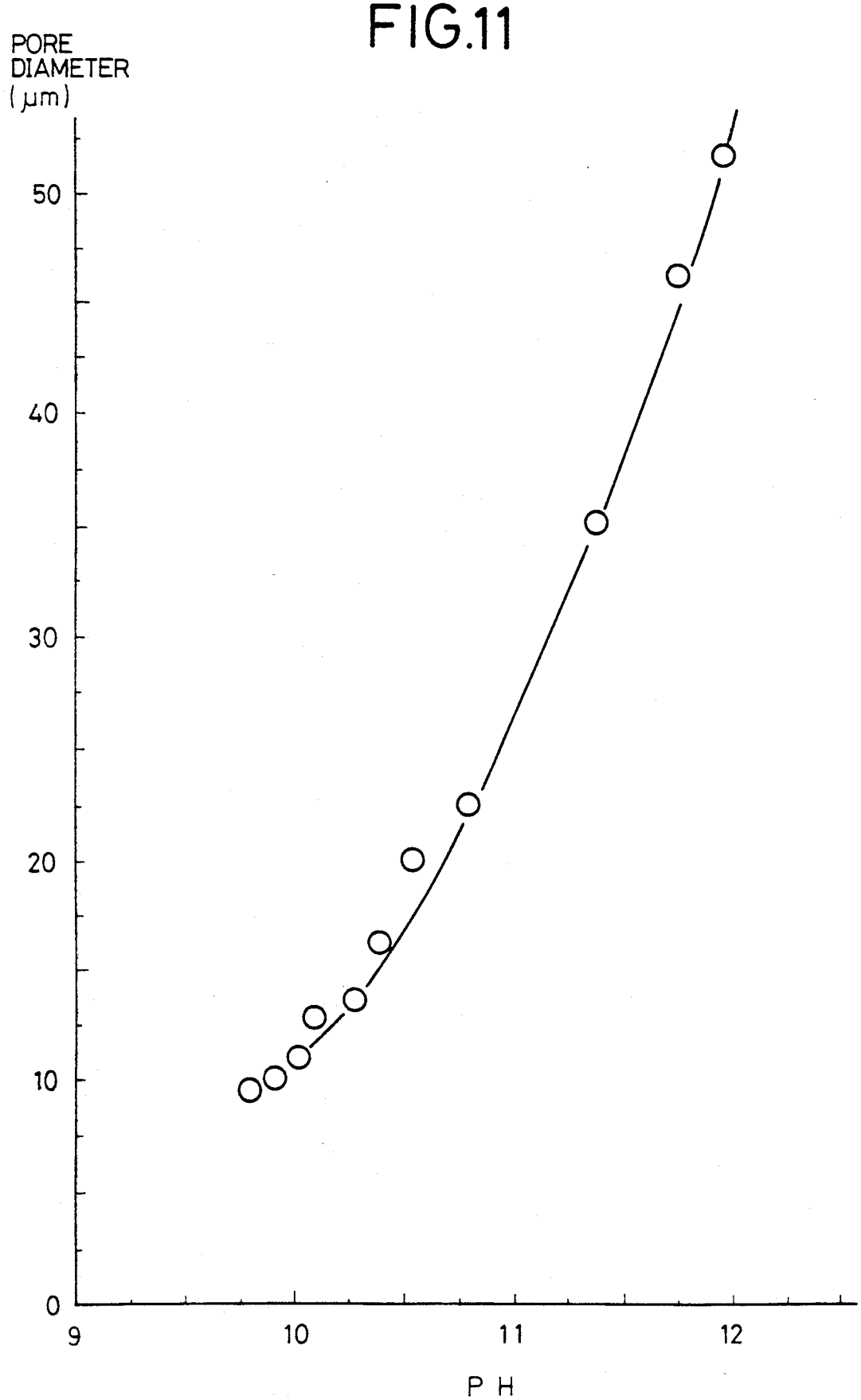
FIG. 11 is a graph illustrating the relationship between the pH of the mixed powder and the size of pores in a sintered article.

After various powders were mixed with the composite powder, ammonia water was added to the mixed powder to provide mixtures of various different pHs. These mixtures were then formed into respective shaped articles as text pieces having a size of 40×12×100 [mm], for example, which were provisionally fired. The provisionally fired pieces were then fully fired into sintered articles, from which specimens having a size of 8×8×60 [mm] were cut out. These specimens were then checked for mechanical strength and pore size. The results are shown in FIGS. 10 and 11.

By selecting the pH of a mixture before it is formed into a shaped article, the diameter of pores in a sintered ceramic article produced by fully firing the shaped article can be adjusted. The pores are impregnated with a metal, and the adjustment of the pH is equivalent to the adjustment of a distribution of the metal to be separated out in the sintered ceramic article.

Therefore, the mechanical strength and toughness of a sintered ceramic article can freely be selected simply by adjusting the pH of the mixture. Through the adjustment of the pH, pores of desired size can forciby be formed in the provisionally fired article, with the advantage that a metal salt or a metal complex can reliably be impregnated in the provisionally fired article. Therefore, in the first through third embodiments, the toughness of the sintered ceramic articles I, II, and III produced by fully firing shaped articles can be selected by mixing ceramic powder with ammonia water to adjust the pH of the ceramic powder and then forming the ceramic powder into such shaped articles.

A manufacturing method according to a fifth embodiment will hereinafter be described in relation to the fourth embodiment described above.

Using a powder mixture of powder of Co and 20 wt % of TiN powder as ceramic powder, composite powder is produced by the apparatus shown in FIG. 8. 1 wt % of the produced composite powder is mixed in place of the composite powder indicated in the fourth embodiment above, and a provisionally fired article is produced by the same process as described in the fourth embodiment.

Figure 12:
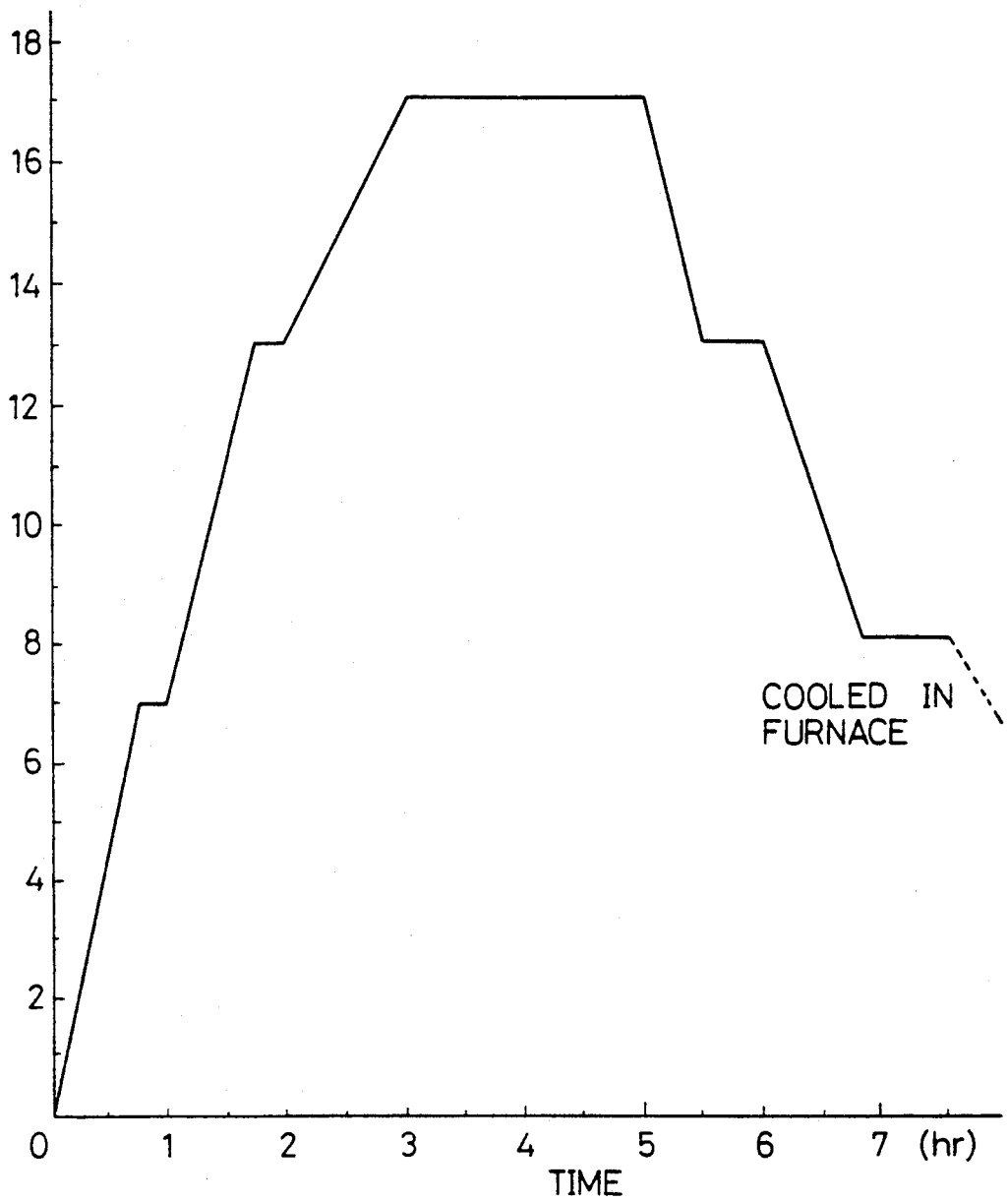
FIG. 12 is a graph showing a fully firing pattern in a manufacturing method of a fifth embodiment of the present invention.

Then, the provisionally fired article is immersed in a saturated solution of nickel nitrate for 30 minutes, and thereafter dried. After the provisionally fired article has been dried, it is fully fired according to a firing pattern shown in FIG. 12 to manufacture a sintered ceramic article.

Figure 13:
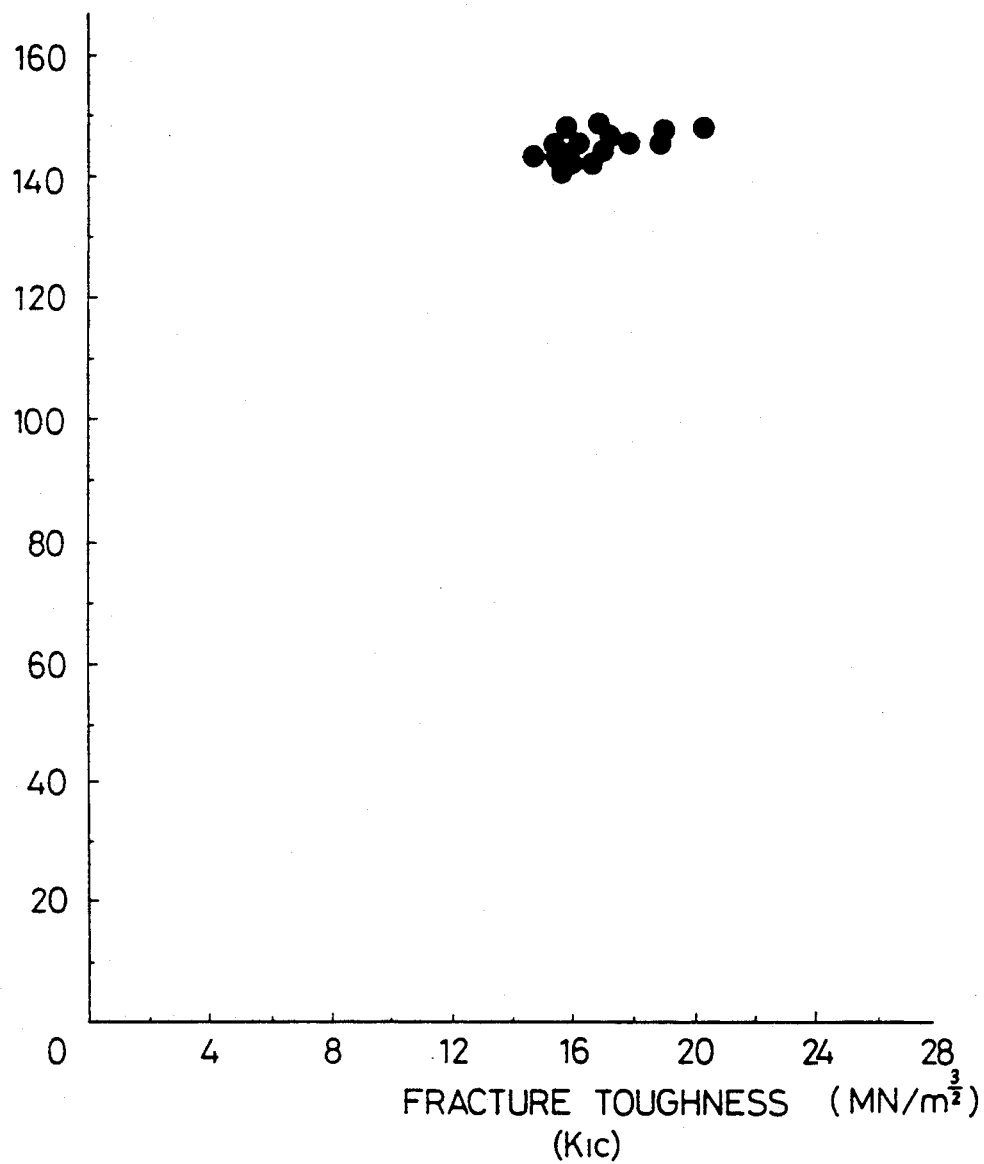
FIG. 13 is a graph showing the relationship between the fracture toughness and the mechanical strength in the fifth embodiment.
Figure 14:
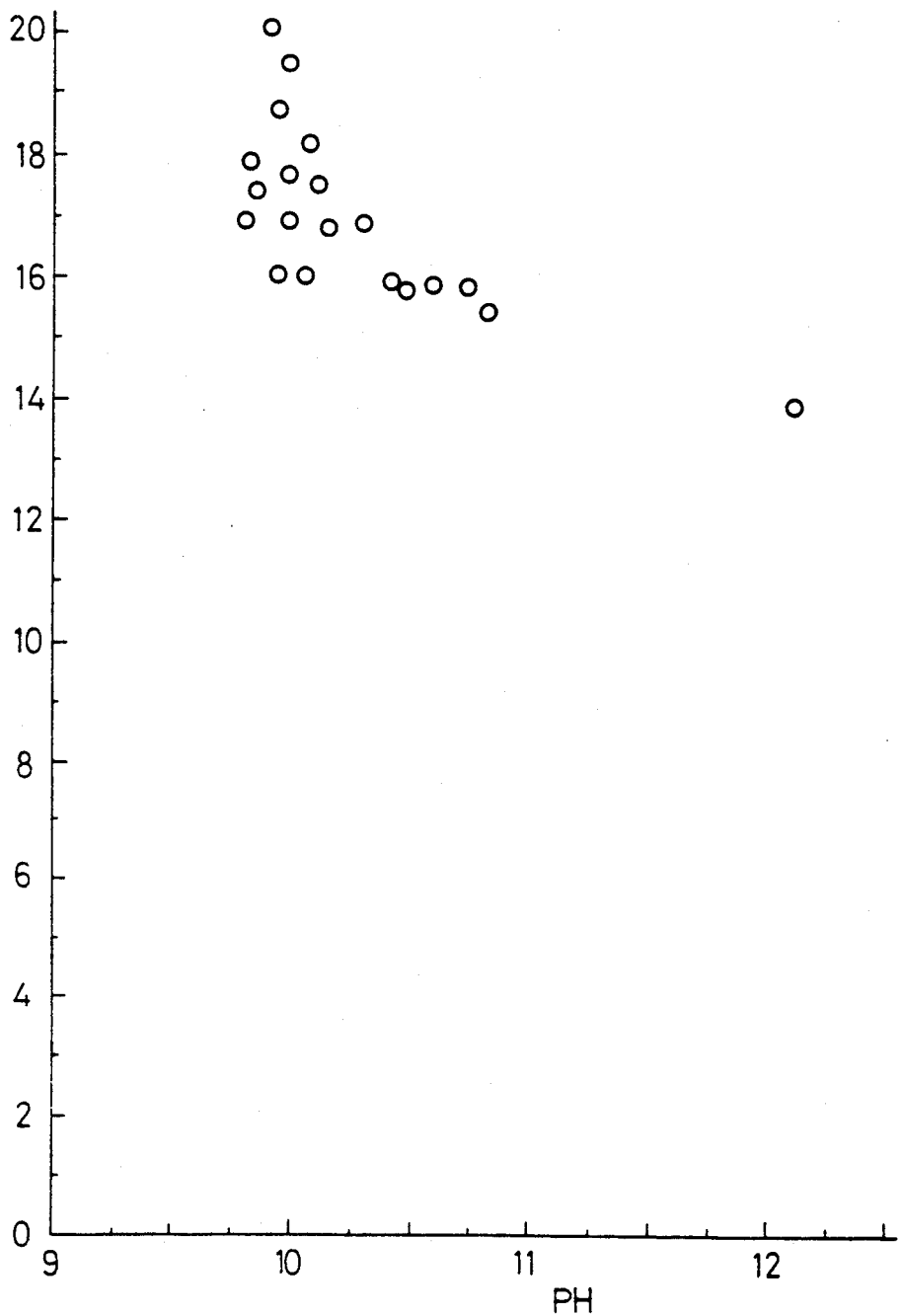
FIG. 14 is a graph showing the relationship between the pH and the fracture toughness in the fifth embodiment.

The sintered ceramic article thus produced was tested for fracture toughness ($K_{IC}$). The results of the test are illustrated in FIG. 13. FIG. 14 shows the relationship between the fracture toughness ($K_{IC}$) and the pH of the mixture. The fracture toughness ($K_{IC}$) of the sintered ceramic article produced by the method of the fifth embodiment was 14 or more, a very high value as with the second embodiment. It was therefore confirmed that the metal was uniformly separated out in the sintered ceramic article, greatly increasing the toughness of the sintered ceramic article.

Figure 15:
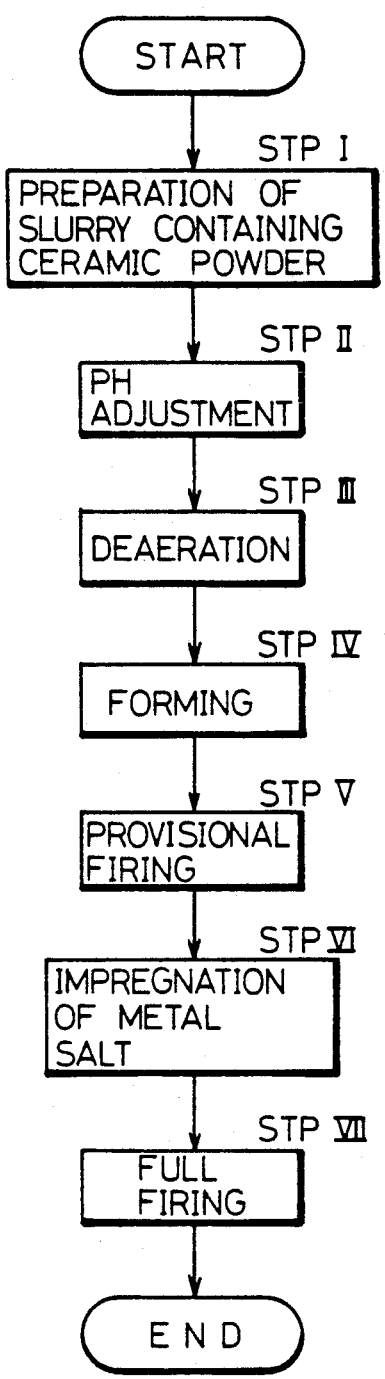
FIG. 15 is a flowchart of a process sequence of manufacturing methods according to sixth and seventh embodiments of the present invention.

A method of manufacturing a sintered ceramic article according to a sixth embodiment of the present invention will be described below with reference to the flowchart of FIG. 15.

First, a slurry containing desired ceramic powder is prepared in a step STPI. Then, the pH of the slurry is adjusted by mixing an acid or alkaline solution in the slurry in a step STPII, after which the slurry is deaerated in a step STPIII. More specifically, air may be trapped in the slurry or an Ar gas may be attached to the surfaces of ceramic powder particles. With the pH of the slurry being adjusted, many bubbles may be produced in the slurry due to the trapped air or the Ar gas. These bubbles are removed by adding a deaerating agent to the slurry and stirring the slurry under a vacuum.

Figure 16:
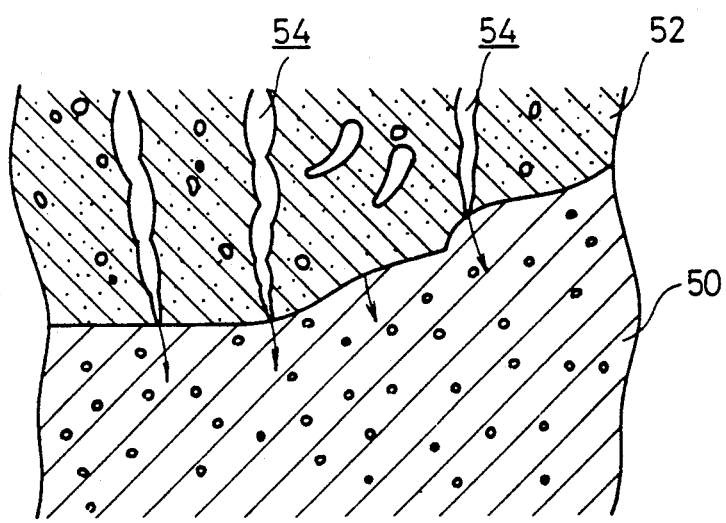
FIG. 16 is a fragmentary cross-sectional view showing the manner in which a shaped article is formed in the manufacturing method of the sixth embodiment.

Then, the slurry is poured into a casting mold in the form of a gypsum mold to produce a shaped article in a step STPIV. At this time, pores are created in the slurry due to aging, and water in the slurry flows into the casting mold as it absorbs the water. Therefore, the pores in the slurry are moved away from the casting mold and joined to each other. Such a condition is shown in FIG. 16. Water contained in the slurry is absorbed into a casting mold 50 as indicated by the arrows, leaving a number of continuous pores 54 in a shaped article 52, the pores 54 being spread in a direction away from the casting mold 50.

After the shaped article 52 has been removed from the casting mold, it is provisionally fired under predetermined conditions to provide a provisionally fired article in a step STPV. Then, the provisionally fired article is immersed in a saturated solution of a metal salt or a metal complex, which is impregnated in the provisionally fired article while ultrasonic energy is being applied in a step STPVI. Then, the provisionally fired article is fully fired in a step STPVII.

According to the present invention, the continuous pores 54 are created in the shaped article 52, the pores 54 spreading away from the surface (the surface to be used) of the shaped article 52 into the shaped article 52. By impregnating the continuous pores 54 with a desired metal while ultrasonic energy is being applied, and then fully firing the shaped article 52, a sintered ceramic article is produced which has the surface to be used that has a desired degree of mechanical strength and a joint surface (back surface) which has increased wettability with metal.

A manufacturing method according to a seventh embodiment of the present invention will be described below in relation to the sixth embodiment. The manufacturing method of the seventh embodiment is carried out in substantially the same manner as the sixth embodiment according to the flowchart of FIG. 15. In the step STPIV, however, a shaped article is produced by injection molding or pressure casting according to the seventh embodiment. With the shaped article thus produced, the surface to be used of a shaped article is highly dense, and a number of pores are uniformly distributed in the shaped article.

A method of manufacturing a sintered ceramic article according to an eighth embodiment will be described below. According to the eighth embodiment, there is employed a sintering process which carries out a chemical reaction and sintering substantially simultaneously. Powder of Si, Cr, Ti, Fe, Ni, Co, Al, or the like, or a combination thereof is used as reaction sintering metal powder.

Sintering assistant powder and carbon black are mixed, if necessary, in desired reaction sintering metal powder. The carbon black is added to produce ceramic in reaction with the metal powder during a reaction sintering process.

When the powder is mixed, an organic dispersant, an additive, a binder, and the like are also added.

The powder thus mixed is then formed into a desired shape by injection molding, extrusion molding, pressure casting, slip casing, or the like. Then, the shaped article is dried and degreased to remove any organic material added in the forming step. The shaped article is provisionally fired at 800° C. through 1200° C. in an inert-gas atmosphere to provide a provisionally fired article. The inert gas used in the provisional firing process is a nitrogen gas, or carbon black is mixed with the metal powder to form an inert coating of a nitride, a carbide, or the like on the surfaces of the metal particles in the provisionally fired article. The inert coating is effective in preventing the metal powder from being eroded when the provisionally fired article is impregnated with a metal salt or a metal complex.

The metal salt or the metal complex may be one of those referred to above in the first embodiment. More specifically, it may be $NiCl_2$, $Ni(NO_3)_4$, $Co(NO_3)_2$, $AgNO_3$, $Mn(NO_3)_2$, $Cr(NO_3)_3$, $CrCl_3$, $Ti(NO_3)_4$, $TiCl_4$, or the like or a mixture thereof, or $H[Co(NH_3)_6]Cl_3$, $Mo(Co)_4C_7H_8$, $NH_4[Co(NO_2)_4(NH_3)_2]$, $[Cu(NH_3)_2]Cl_2$, $(NH_4)_4[Fe(CN)_6]$, $(NH_4)_4[Fe(CN)_6]$, or the like or a mixture thereof.

After the metal salt and/or the metal complex has been impregnated in the provisionally fired article and it has been dried, it is subjected to a reaction firing process (full firing). In the reaction sintering process, ceramic produced by the reaction of the reaction sintering metal powder of the provisionally sintered article and the metal separated out from the metal salt or metal complex are combined with each other. The ceramic may be of a different nature dependent on the material of the shaped article and the atmosphere employed in the reaction sintering process. For example, where carbon black is mixed in the shaped article and the shaped article is subjected to reaction sintering in an argon-gas atmosphere, the ceramic is composed of a nitride. Where the shaped article is subjected to reaction sintering, the ceramic is composed of a carbide and a nitride. If the shaped article is subjected to reaction sintering in a nitrogen-gas atmosphere without using carbon black, then the ceramic is composed of a nitride.

According to the eighth embodiment, as described above, a shaped article is produced using a reaction sintering metal, and after the shaped article has been provisionally fired, it is impregnated with a metal salt and/or a metal complex, and then subjected to a reaction sintering process to produce a sintered ceramic article. Therefore, the sintered ceramic article itself has a prescribed degree of mechanical strength and can be handled with ease. The provisionally fired article is not broken while it is being impregnated with the metal salt or the like. Since the pores in the provisionally fired articles are filled with the ceramic produced by reaction with the metal powder and the metal separated out from the metal salt or the like during the reaction sintering process, the sintered ceramic article thus produced has high mechanical strength and is dimensionally stable.

A manufacturing method according to a ninth embodiment wi 1 be described below in relation to the eighth embodiment.

Figure 17:
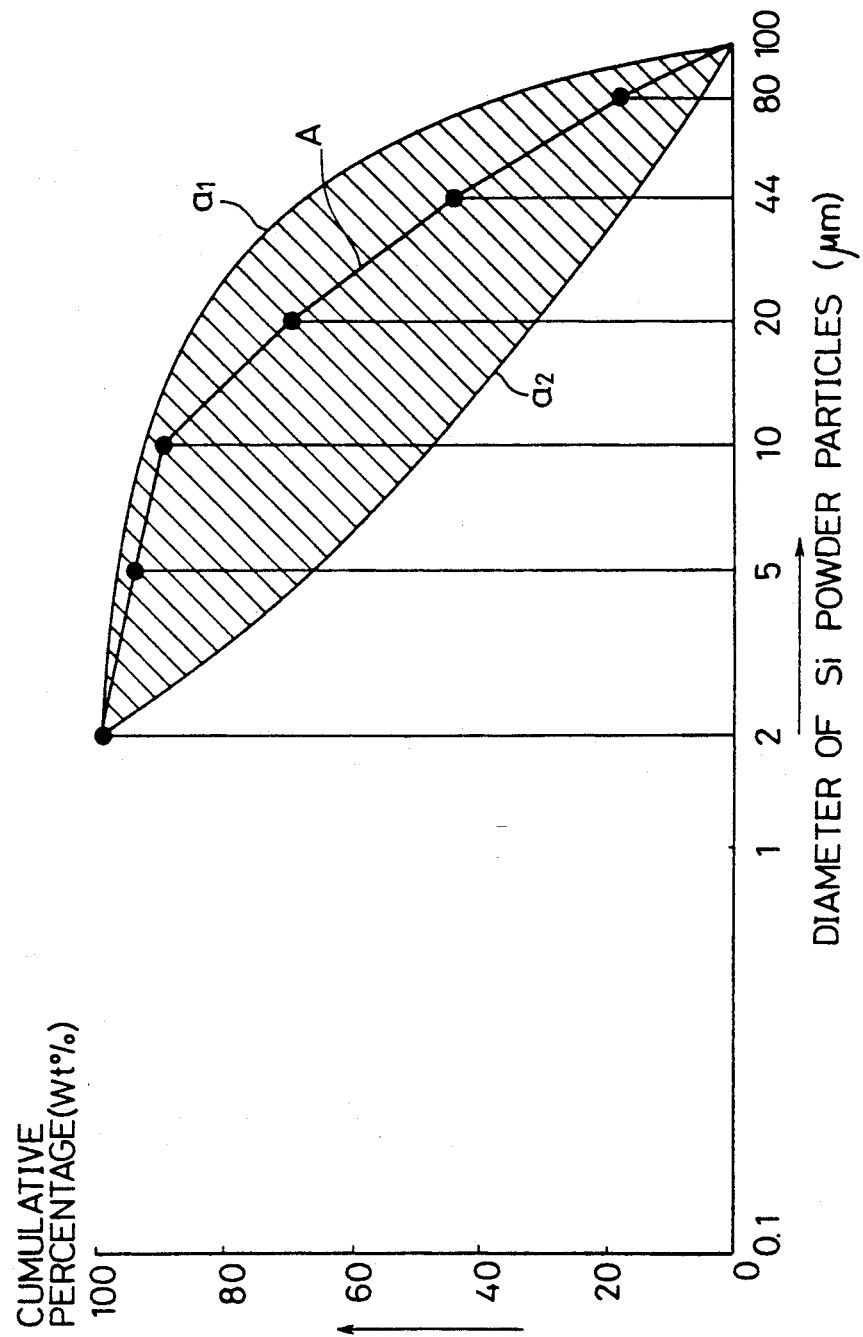
FIG. 17 is a graph showing the relationship between the diameter of Si powder particles and the cumulative percentage in a method of manufacturing a sintered ceramic article according to a ninth embodiment of the present invention.

Si powder is employed as a reaction sintering metal, the Si powder having particle sizes and a particle size distribution as shown in FIG. 17 and the following Table 1:

TABLE 1

| Diameter (μm) | Content (wt %) |
|---|---|
| 800–100 | 18 |
| 44 | 32 |
| 20 | 20 |
| 10 | 20 |
| 5 | 5 |
| 2 | 5 |

FIG. 17 shows a shaded area surrounded by curves $a_1$ and $a_2$ in which a shaped article having a high packing density (close-packed structure) can be obtained.

The particle size and the particle size distribution are adjusted according to the close-packed formula of Andreasen or based on the Fuller curve. It is also important that the powder be have good flowability.

95 wt % of Si powder, 5 wt % of carbon black having an average diameter of 50 Å, and alcohol are well mixed to produce a mixture in which the carbon black is uniformly dispersed in the Si powder.

After a forming organic binder has been added to the mixture, it is formed into a plurality of flat shaped articles each having a vertical dimension of 80 mm, a horizontal dimension of 80 mm, and a thickness of 10 mm, using a slip casting process and a uniaxial pressure casting process. In the uniaxial pressure casting process, forming pressures are set to 100 MPa and 200 MPa, respectively, and a plurality of shaped articles are formed under the preset forming pressures.

After the shaped articles have been dried, they are placed in a furnace and degreased to remove an organic material. While the shaped articles are degreased, a nitrogen gas is passed at a rate of 30 ml/min., the vacuum pressure in the furnace ranges from 0.4 to 0.55 Torr, and the temperature increases at a rate of 10° C./min. The shaped articles are held in the furnace for 60 minutes at 650° C.

After the shaped articles have been degreased, they are divided into three groups. The shaped articles in the three groups are then provisionally fired in the same furnace to produce provisionally fired articles under the same conditions as those of the above degreasing step except that the temperature rises at a rate of 15° C./min., and the shaped articles of the first group are held for 30 minutes at 1200° C., those of the second group for 60 minutes at 1200° C., and those of the third group for 120 minutes at 1200° C.

The bending resistance of the provisionally fired articles is practically 20 kgf/cm$^2$ for the first group, and 90 kg/cm$^2$ for the second and third groups, thus indicating that sintering has progressed to a certain extent.

Provisionally fired articles were also produced at 1000° C. under the same other conditions as described above. The bending resistance of the provisionally fired articles thus obtained was 7 kgf/cm$^2$ for the first group, 20 kgf/cm$^2$ for the second group, and 30 kgf/cm$^2$ for the third group.

The provisionally fired articles which are fired at 1200° C. and those which are fired at 1000° C. are then immersed in a saturated solution of Ni(NO$_3$)$_2$ and NiCl$_2$, and kept therein for 10 minutes while ultrasonic energy with the frequency of 16 MHz is being applied, to allow the articles to be impregnated with the solution. The provisionally fired articles thus treated substantially exhibit gray dark green.

The provisionally fired articles are then taken out of the solution. They are kept at 110° C. for four hours in a first drying step, then at 210° C. for three hours in a second drying step, and at 350° C. for four hours in a third drying step.

Thereafter, the provisionally fired articles are subjected to reaction sintering in a nitrogen-gas atmosphere to produce sintered ceramic articles. The reaction sintering is effected according to a sintering pattern indicated by the solid-line curve X in FIG. 18. More specifically, the temperature is increased at a rate of 700° C./30 min., kept at 700° C. for 15 minutes, increased at a rate of 650° C./45 min., kept at 1350° C. for 60 minutes, and increased at a rate of 150° C./30 min. Then, the temperature is kept at 1500° C. for 30 minutes, increased at a rate of 200° C./40 min., thereafter kept at 1700° C. for 60 minutes, reduced at a rate of 300° C./20 min. and kept 1400° C. for 60 minutes. Then, the articles are cooled in the furnace so as to be annealed at 800° C.

The linear shrinkage of each of the sintered ceramic articles due to the sintering process was 0.2%, and the relative density thereof was about 92%. Test pieces having a vertical dimension of 8 mm, a horizontal dimension of 8 mm, and a length of 60 mm were cut out of the sintered ceramic articles, and tested for mechanical strength. The average bending resistance was 82 kgf/mm$^2$, the average Weibull modulus was 21, and the average fracture toughness (simple average) was 9.6 MPam$^{\frac{1}{2}}$.

The measured data indicate that the temperature at which and the time for which the shaped articles are provisionally fired have almost no effect on the mechanical strength of the sintered ceramic articles.

The reason why the sintered ceramic article has excellent mechanical strength is as follows: Powder used has a wide range of grain and a side grain distribution in order to maintain high packing density. However due to erosion by the saturated solution, carbonization of Ni, cumulative expansion caused by nitriding, and other various factors, the powder particles are fractured and rearranged, or due to evaporation and condensation of products, the powder particles are decomposed and rearranged. This causes the primary particles after sintering to have a diameter ranging from 3 to 5 $\mu$m, so that these particles are uniranging formized entirely in the sintered ceramic article.

FIG. 17 is a photographic representation showing he structure of a sintered ceramic article, as viewed through a scanning electron microscope (magnification: 5000). The photograph indicates that the pores are filled with black nickel.

According to the ninth embodiment, as described above, the grain and grain distribution of the metal powder are adjusted to obtain a high packing density. Therefore, it is possible to make a sintered ceramic article highly packed, and hence to increase the mechanical strength and dimensional stability of the sintered ceramic article.

A manufacturing method according to a tenth embodiment similar to the ninth embodiment will be described below.

Alcohol is added to Si powder which is the same as that used in the ninth embodiment, and they are well mixed. A forming binder is also added to the mixture. The mixture is then formed by a slip casting process into a plurality of flat shaped articles each having a vertical dimension of 80 mm, a horizontal dimension of 80 mm, and a thickness of 10 mm.

After the shaped articles have been dried, they are degreased in a furnace under the same conditions as those in the ninth embodiment, and then provisionally fired in the same furnace in he same atmosphere as that of the degreasing step. In the provisional firing step, the temperature is increased at a rate of 15° C./min. and kept at 1200° C. for 90 minutes.

The bending resistance of each of the provisionally fired articles was 80 kgf/cm$^2$. The provisionally fired articles are impregnated, dried, and then subjected to reaction sintering under the same conditions as those in the ninth embodiment, thereby producing sintered ceramic articles.

The linear shrinkage of each of the sintered ceramic articles due to the sintering process was 0.6%, and the relative density thereof was about 95%. Test pieces having a vertical dimension of 8 mm, a horizontal dimension of 8 mm, and a length of 60 mm were cut out of the sintered ceramic articles, and tested for mechanical strength. The average bending resistance was 80 kg/mm$^2$, the average Weibull modulus was 20, and the average fracture toughness (simple average) was 8.4 MPam$^{\frac{1}{2}}$. Therefore, it can readily be understood that the tenth embodiment is as advantageous as the ninth embodiment.

A method of manufacturing a sintered ceramic article according to a eleventh embodiment of the present invention will he described below. In the eleventh embodiment, reaction sintering metal powder is employed as with the eighth through tenth embodiments described above. The reaction sintering metal powder is mixed with ceramic powder described in the first embodiment, i.e., oxide powder of SiO$_2$, Al$_2$O$_3$, ZrO$_2$, or the like nitride powder of Si$_3$N$_4$, TiN, ZrN, BN, or the like, or carbide powder of SiC, TiC, MoC, or the like, singly or in combination.

The reaction sintering metal powder and ceramic powder are mixed with each other, and the mixed powder is further mixed with sintering assistant powder, carbon black, a binder, or the like, if necessary. The mixture is then formed into a desired shape. The shaped article is dried, degreased with heat, and then provisionally fired to produce a provisionally fired article. The provisionally fired article is impregnated with a metal salt and/or a metal complex, and thereafter fully fired to produce a sintered ceramic article. These processing steps are effected under the same conditions as those employed in the eighth embodiment.

During the fully firing step, the ceramic powder particles are coupled to each other, ceramic particles produced in reaction with the metal powder and the metal powder particles are coupled to each other, and the metal powder particles are coupled to each other through the ceramic. At the same time, the pores in the provisionally fired article are filled with metal separated out from the ceramic and the metal salt or the like.

In the eleven h embodiment, the mixture of metal powder and ceramic powder is employed to produce a shaped article. Therefore, the particles are combined by the ceramic powder. As a result, the bending resistance and the fracture toughness of the sintered ceramic article are increased.

Twelfth through fourteenth embodiments of the present invention will be described below in relation to the eleventh embodiment.

In the twelfth embodiment, a powder mixture of $Si_3N_4$ powder, Al powder, and Si powder is employed, the powder mixture being adjusted to have a grain and a grain distribution as shown by the curve B in FIG. 20 and in the following Table 2:

TABLE 2

| Diameter ($\mu$m) | Content (wt %) |
|---|---|
| 800~100 | 10 |
| 44 | 10 |
| 20 | 18 |
| 10 | 22 |
| 5 | 20 |
| 2 | 7 |
| 1 | 8 |
| 0.5 | 2 |
| 0.2 | 1 |
| 0.1 | 2 |

Figure 18:
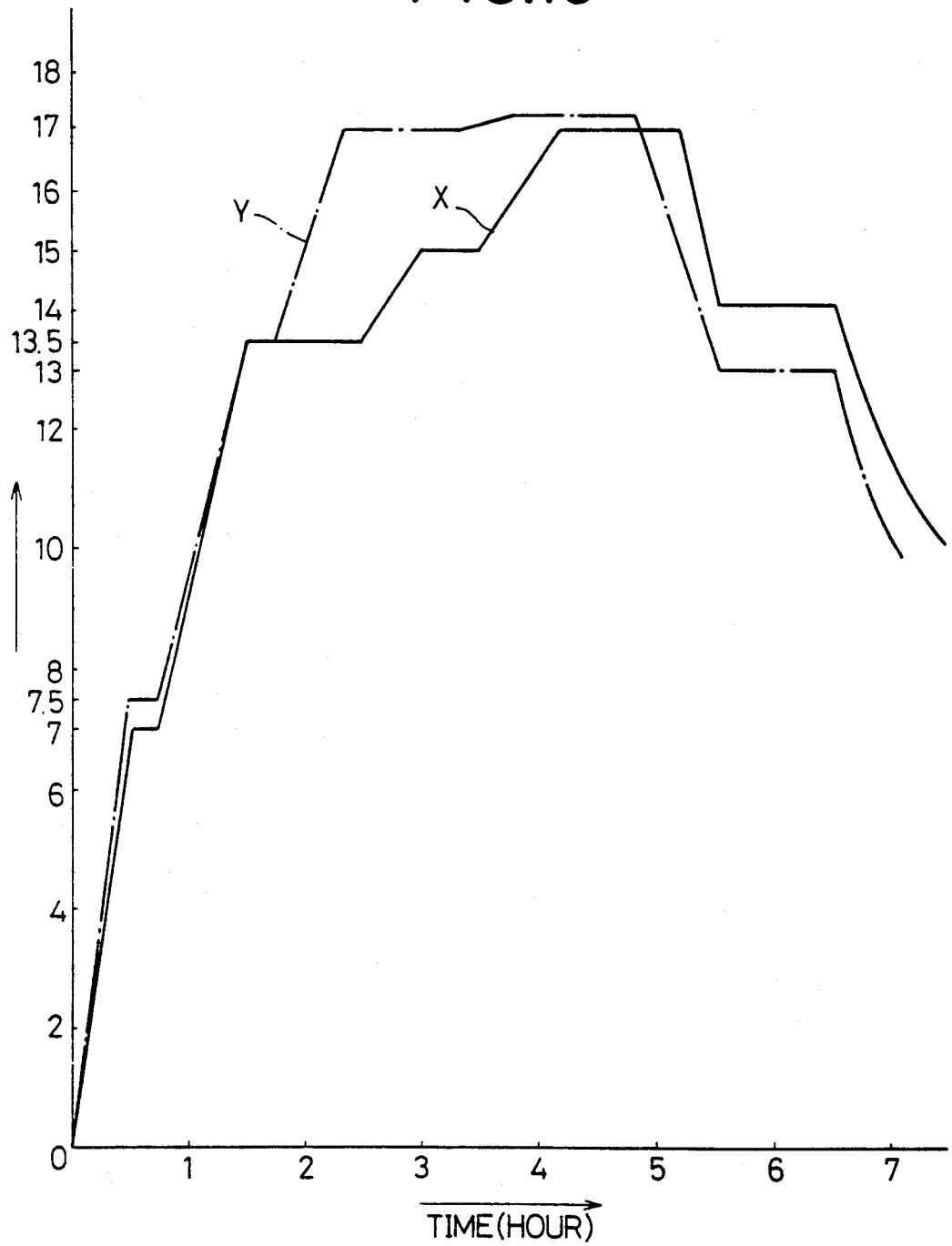
FIG. 18 is a graph illustrating the relationship between the time and the temperature in a reaction sintering process.
Figure 19:
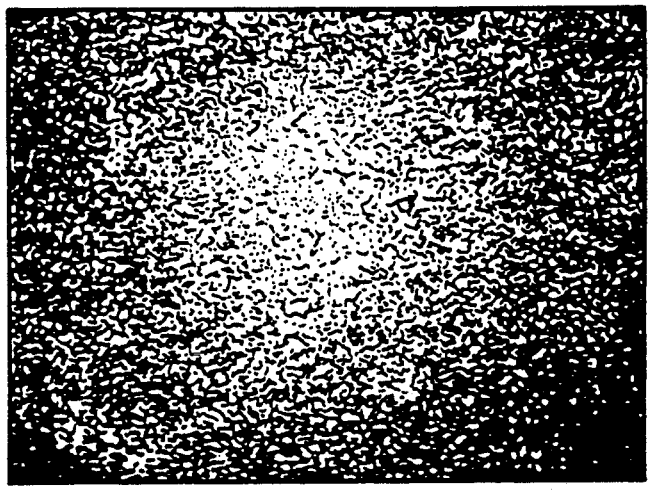
FIG. 19 is a photographic representation produced by a scanning electron microscope of the structure of a sintered ceramic article produced according to the manufacturing method of the ninth embodiment.

FIG. 18 shows a shaded area surrounded by curves $b_1$ and $b_2$ in which a shaped article having a high packing density can be obtained.

20 wt % of $Si_3N_4$ powder, 10 wt % of Al powder, and 61 wt % of Si powder are mixed with each other. Then, 91 wt % of such mixed powder, 5 wt % of $Y_2O_3$ powder, 4 wt % of carbon black, an organic dispersant, an organic additive, and a solution of water and alcohol are well mixed with each other, thereby producing a mixture with the $Y_2O_3$ powder and the carbon black uniformly dispersed in the mixed powder.

The mixture is then formed by slip casting and mold pressure casting into a plurality of flat shaped articles having a vertical dimension of 80 mm, a horizontal dimension of 80 mm, and a thickness of 10 mm. After the shaped articles were sufficiently dried, their apparent porosity was measured. Those shaped articles which were formed by slip casting had the porosity of 18%, and those by mold pressure casing had the porosity of 13%.

The shaped articles are placed in a furnace and degreased to remove any organic component. The degreasing step is carried out by increasing the temperature up to 485° C. in the atmosphere, then increasing the temperature up to 650° C. at a rate of 10° C./min. while a nitrogen gas is being passed at a rate of 40 ml/min., and keeping the temperature at 650° C. for 60 minutes.

After the shaped articles have been degreased, they are provisionally fired in the same furnace by increasing the temperature at a rate of 15° C./min. and keeping the temperature at 1200° C. for 120 minutes under the same conditions as those in the degreasing step. Because a volatile component was produced by the degreasing step, the vacuum pressure in the furnace was in the range of from 0.4 to 0.8 Torr.

The provisionally fired articles are then immersed in a saturated solution of $H[Co(NH_3)_6]Cl_3$ and $[Cu(NH_3)_2]Cl_2$, and kept therein for 15 minutes while ultrasonic energy with the frequency of 16 MHz is being applied, to allow the articles to be impregnated with the solution. The provisionally fired articles are then taken out of the solution. They are kept at 110° C. for four hours in a first drying step, then at 260° C. for three hours in a second drying step, at 350° C. for four hours in a third drying step, and at 450° C. for four hours in a fourth drying step, after which they are cooled the furnace.

Thereafter, the provisionally fired articles are subjected to reaction sintering in a nitrogen-gas atmosphere to produce sintered ceramic articles. The reaction sintering is effected according to a sintering pattern indicated by the solid-line curve Y in FIG. 18. More specifically, the temperature is increased at a rate of 750° C./30 min., kept at 750° C. for 15 minutes, increased at a rate of 600° C./45 min., kept at 1350° C. for 15 minutes, and increased at a rate of 350° C./33 min. Then, the temperature is kept at 1700° C. for 60 minutes, increased at a rate of 30° C./30 min., thereafter kept at 1730° C. for 60 minutes, reduced at a rate of 430° C./45 min. and kept 1300° C. for 60 minutes. Then, the articles are cooled in the furnace so as to be annealed at 800° C.

The linear shrinkage of each of the sintered ceramic articles due to the sintering process was 0.5%, and the relative density thereof was about 98%. The sintered ceramic articles were apparently dense. After they have been sufficiently ground, the surfaces thereof were observed with an optical microscope. As a result, it was confirmed that the maximum pore had a diameter of 30 $\mu$m and pores having an average pore diameter of about 5 $\mu$m were distributed.

Test pieces having a vertical dimension of 8 mm, a horizontal dimension of 8 mm, and a length of 60 mm were cut out of the sintered ceramic articles, and tested for mechanical strength. The average bending resistance was 93 kgf/mm$^2$, the average Weibull modulus was 23, and the average fracture toughness ranged from 8 to 9 MPam$^{\frac{1}{2}}$. The measured data indicate that the process of forming the shaped articles have almost no effect on the mechanical strength of the sintered ceramic articles.

A thirteenth embodiment will be described hereinbelow. In the thirteenth embodiment, the same materials as those in the twelfth embodiment are employed, and the shaped articles are impregnated with the solution in the same manner as in the twelfth embodiment, and then dried to produce provisionally fired articles.

Using the same sintering pattern as that in the twelfth embodiment, the provisionally fired articles are subjected to reaction sintering in a furnace under a pressure of 300 kgf/cm$^2$ and a nitrogen gas partial pressure of about 60 kgf/cm$^2$.

The linear shrinkage of each of the sintered ceramic articles due to the sintering process was 0.8%, and the relative density thereof was about 99%. After they have been sufficiently ground, the surfaces thereof were observed with an optical microscope. As a result, it was confirmed that the maximum pore had a diameter of 5 $\mu$m. Because of the reaction sintering process under the pressure described above, the microscopic structure of the sintered ceramic articles was filamentary or columnar, having a diameter ranging from about 0.7 to 1.0 $\mu$m and a length of 3 $\mu$m.

Test pieces having a vertical dimension of 8 mm, a horizontal dimension of 8 mm, and a length of 60 mm were cut out of the sintered ceramic articles, and tested for mechanical strength. The average bending resistance was 95 kgf/mm$^2$, the average Weibull modulus was 27, and the average fracture toughness was 10.8 MPam$^{\frac{1}{2}}$ (the minimum value was 10.4 MPam$^{\frac{1}{2}}$ and the maximum value was 11.8 MPam$^{\frac{1}{2}}$.

A fourteenth embodiment of the present invention will be described below.

In the fourteenth embodiment, two powder mixtures composed of Si$_3$N$_4$, Al powder, and Si powder are employed, and adjusted to have a grain and a grain distribution similar to those of the powder mixture in the twelfth embodiment.

One of the powder mixtures includes medium-size particles having a diameter of 20 $\mu$m and made of Al powder and Si powder. The other powder mixture includes medium-size particles and large-size particles having a diameter of 44 $\mu$m, the medium-size particles and part of the large-size particles being made of Al powder and Si powder.

34 wt % of Si$_3$N$_4$ powder, 15 wt % of Al powder, and 40 wt % of Si powder are mixed with each other. Then, 89 wt % of such powder mixtures, 6 wt % of Y$_2$O$_3$ powder, 5 wt % of Al$_2$O$_3$, and alcohol are well mixed with each other, thereby producing two mixtures with the Y$_2$O$_3$ powder and the Al$_2$O$_3$ uniformly dispersed.

Each of the mixtures is then formed by slip casting into a plurality of flat shaped articles having a vertical dimension of 80 mm, a horizontal dimension of 80 mm, and a thickness of 10 mm. After the shaped articles were sufficiently dried, they are placed in a furnace and degreased to remove any organic component under the same conditions as in the twelfth embodiment.

After the shaped articles have been degreased, they are provisionally fired in the same furnace under the same conditions as in the twelfth embodiment to produce provisionally fired articles. The linear shrinkage of the provisionally fired articles was 0.1%.

The provisionally fired articles are then immersed in a saturated solution of Ni(NO$_3$)$_2$ and NiCl$_2$, and kept therein for 10 minutes while ultrasonic energy with the frequency of 8 MHz is being applied, to allow the articles to be impregnated with the solution.

The provisionally fired articles are then taken out of the solution, and then dried in the same manner as in the twelfth embodiment.

Thereafter, the provisionally fired articles are subjected to reaction sintering according to the same sintering pattern as in the twelfth embodiment, thus providing two sintered ceramic articles. The linear shrinkage of each of the sintered ceramic articles due to the sintering process was 0.15%, and the relative density thereof was about 98%.

Test pieces having a vertical dimension of 8 mm, a horizontal dimension of 8 mm, and a length of 60 mm were cut out of the sintered ceramic articles, and tested for mechanical strength. The average bending resistance was 112 kgf/mm$^2$ (1.1 Gpa), the average Weibull modulus was 24, and the average fracture toughness was 9.2.

It can now be seen that the two sintered ceramic articles made from different powder mixtures exhibit the same properties.

With the present invention, as described above, a metal compound or a metal is separated out and diffused in the surface layers of particles of a sintered ceramic article. Therefore, the wettability of the sintered ceramic article with respect to metal is increased, and the sintered ceramic article will not be cracked even if it is subjected to repeated heat changes. The sintered ceramic article therefore can find a wider range of applications.

According to the present invention, a shaped article is produced using ceramic powder, and after it is provisionally fired, a metal sa)t and/or a metal complex is impregnated in the provisionally fired article, which is then fully fired to produce a sintered ceramic article.

Furthermore, the provisionally fired article is fully fired in an inert-gas or reducing atmosphere to provide the sintered ceramic article.

Since the provisionally fired article is first produced, the metal salt and the metal complex can sufficiently be impregnated in many pores in the provisionally fired article. By reducing the metal salt and the metal complex while the provisionally fired article is being fully fired, metal can uniformly and reliably be separated out in the sintered ceramic article. As a result, the sintered ceramic article thus produced does not has a wide range of variations in mechanical strength, is of excellent quality, and has increased toughness.

Moreover, composite power of ceramic and a metal is prepared, and is mixed with ceramic powder. The mixture is then formed into a shaped article that is provisionally fired. After the provisionally fired article is impregnated with a metal salt and/or a metal complex, it is fully fired to produce a sintered ceramic article. Inasmuch as the composite powder of ceramic and a metal is employed, the sintered ceramic article has increased wettability with metal and excellent quality.

Before the shaped article is produced using the ceramic powder, or when the composite powder and the ceramic powder are mixed, ammonia water or the like is added, if necessary, for pH adjustment. Accordingly, the size of pores in the sintered ceramic article can be selected, and the distribution of metal separated out in the pores can be adjusted to select the toughness and other properties of the sintered ceramic article.

In addition, after an acid or alkaline solution is mixed in the ceramic powder to effect pH adjustment, it is deaerated, and then formed into a shaped article by mold casting, injection molding, or pressure casting. Consequently, continuous pores or uniformly distributed pores can selectively be created in the shaped article.

According to the present invention, furthermore, reaction sintering metal powder is employed, and a reaction sintering process and resulting separation of a metal from a metal salt and the like are used to make a sintered ceramic article which is high in mechanical strength and good in dimensional stability.

By employing reaction sintering metal powder having a prescribed grain and a prescribed grain distribution, the produced sintered ceramic article is of a close-packed structure which provides high mechanical strength and dimensional stability.

Moreover, a shaped article is formed by using a powder mixture of reaction sintering metal powder and ceramic powder. Since the particles are combined or coupled to each other by the ceramic powder, a sintered ceramic article which is excellent in mechanical strength can be manufactured.

Although certain preferred embodiments have been shown and described, it should be understood that many changes and modifications may be made therein without departing from the scope of the appended claims.

What is claimed is:

1. A method of manufacturing a sintered ceramic article, comprising the steps of:
    mixing an acid or alkaline solution in ceramic powder to adjust the pH of said ceramic powder;
    forming said ceramic powder into a shaped article;
    provisionally firing said shaped article;
    thereafter immersing the provisionally fired article in a solution of a metal salt and/or a metal complex whereby said metal salt and/or said metal complex are/is impregnated in said provisionally fired article; and
    fully firing said provisionally fired article to produce a sintered ceramic article, whereby the toughness of said sintered ceramic article is adjusted.

2. A method of manufacturing a sintered ceramic article, comprising the steps of:
    adjusting the pH of a slurry containing ceramic powder;
    forming said ceramic powder into a shaped article;
    provisionally firing said shaped article;
    thereafter immersing the provisionally fired article in a solution of a metal salt and/or a metal complex whereby said metal salt and/or said metal complex are/is impregnated in said provisionally fired article; and
    fully firing said provisionally fired article to produce a sintered ceramic article, whereby the toughness of said sintered ceramic article is adjusted.

3. A method according to claim 1 or 2, further including the step of:
    casting a slurry containing said ceramic powder in a gypsum mold to produce said shaped article.

4. A method according to claim 1 or 2, further including the step of:
    forming a slurry containing said ceramic powder into said shaped article by injection molding or pressure casting.

5. A method of manufacturing a sintered ceramic article, comprising the steps of:
    mixing composite powder of ceramic and a metal with ceramic powder to produce mixed powder;
    mixing an acid or alkaline solution in said mixed powder to adjust the pH of said mixed powder;
    forming said mixed powder into a shaped article;
    provisionally firing said shaped article;
    thereafter immersing the provisionally fired article in a solution of a metal salt and/or a metal complex whereby said metal salt and/or said metal complex are/is impregnated in said provisionally fired article; and
    fully firing said provisionally fired article in an inert or reducing atmosphere to produce a sintered ceramic article, whereby the toughness of said sintered ceramic article is adjusted.

6. A method according to claim 5, wherein said provisionally fired article is fully fired in a nitrogen-gas atmosphere.

7. A method of manufacturing a sintered ceramic article, comprising the steps of:
    mixing an acid or alkaline solution in ceramic powder to adjust the pH of said ceramic powder;
    forming said ceramic powder into a shaped article;
    provisionally firing said shaped article;
    thereafter immersing the provisionally fired article in a solution of a metal salt and/or a metal complex whereby said metal salt and/or said metal complex are/is impregnated in said provisionally fired article; and
    fully firing said provisionally fired article to produce a sintered ceramic article, whereby the size of pores in said sintered ceramic article and the distribution of said metal to be separated out in said sintered ceramic article are adjusted to adjust the toughness of said sintered ceramic article.

8. A method of manufacturing a sintered ceramic article, comprising the steps of:
    adjusting the pH of a slurry containing ceramic powder;
    forming said ceramic powder into a shaped article;
    provisionally firing said shaped article;
    thereafter immersing the provisionally fired article in a solution of a metal salt and/or a metal complex whereby said metal salt and/or said metal complex are/is impregnated in said provisionally fired article; and
    fully firing said provisionally fired article to produce a sintered ceramic article, whereby the size of pores in said sintered ceramic article and the distribution of said metal to be separated out in said sintered ceramic article are adjusted to adjust the toughness of said sintered ceramic article.

9. A method according to any one of claims 1, 2, 7 or 8, wherein said solution of a metal salt and/or a metal complex is a saturated solution thereof.

10. A method according to any one of claims 1, 2, 7 or 8, wherein said impregnation of said metal salt and/or said metal complex is effected under the application of ultrasonic energy.

* * * * *